US012372505B2

(12) United States Patent
Frentzel et al.

(10) Patent No.: US 12,372,505 B2
(45) Date of Patent: Jul. 29, 2025

(54) METHODS AND SYSTEMS FOR SENSING HEADSPACE VIAL PRESENCE

(71) Applicant: AGILENT TECHNOLOGIES, INC., Santa Clara, CA (US)

(72) Inventors: Jonathan Michael Frentzel, Santa Clara, CA (US); Thomas E. Price, Santa Clara, CA (US); Jared M. Bushey, Santa Clara, CA (US); Paul C. Dryden, Santa Clara, CA (US)

(73) Assignee: AGILENT TECHNOLOGIES, INC., Santa Clara, CA (US)

( * ) Notice: Subject to any disclaimer, the term of this patent is extended or adjusted under 35 U.S.C. 154(b) by 220 days.

(21) Appl. No.: 17/922,931

(22) PCT Filed: Apr. 9, 2021

(86) PCT No.: PCT/US2021/026556
§ 371 (c)(1),
(2) Date: Nov. 2, 2022

(87) PCT Pub. No.: WO2021/225746
PCT Pub. Date: Nov. 11, 2021

(65) Prior Publication Data
US 2023/0160865 A1    May 25, 2023

Related U.S. Application Data

(60) Provisional application No. 63/021,822, filed on May 8, 2020.

(51) Int. Cl.
*G01N 30/88* (2006.01)
*B01D 53/02* (2006.01)
(Continued)

(52) U.S. Cl.
CPC ........... *G01N 30/88* (2013.01); *B01D 53/025* (2013.01); *G01N 1/44* (2013.01); *G01N 30/24* (2013.01);
(Continued)

(58) Field of Classification Search
CPC .......... G01N 30/88; G01N 1/44; G01N 30/24; G01N 35/04; G01N 2030/025;
(Continued)

(56) References Cited

U.S. PATENT DOCUMENTS 5,711,786 A * 1/1998 Hinshaw ................ G01N 30/16
95/82
6,395,560 B1 5/2002 Markelov
(Continued)

FOREIGN PATENT DOCUMENTS

CN    106999955 A    8/2017
EP    3561477 A1    10/2019
(Continued)

OTHER PUBLICATIONS

"Reason for Rejection" with English translation for Japan Application No. JP2022-566692, mailed Jan. 30, 2024, 8 pages.
(Continued)

*Primary Examiner* — Freddie Kirkland, III

(57) ABSTRACT

Methods and systems for sensing headspace vial presence are described herein. In one embodiment, a system can include a sample probe, a fluid source in fluid communication with the sample probe, one or more of a pressure sensor and a flow sensor in fluid communication with the sample probe, and a processor configured to: (a) receive a first set of signals from the one or more of the pressure and flow sensors, execute an ejection procedure to remove a sample vial from the sample probe, receive a second set of signals from the one or more of the pressure sensor and the flow
(Continued)

sensor during step (b), (d) detect whether the ejection procedure is successful from the first set of signals and the second set of signals, and (e) in response to the detecting, initiate one or more actions selected from the group consisting of: a remediation and an alert.

24 Claims, 14 Drawing Sheets

(51) Int. Cl.
| | | |
|---|---|---|
| *G01N 1/44* | (2006.01) | |
| *G01N 30/24* | (2006.01) | |
| *G01N 35/04* | (2006.01) | |
| G01N 30/02 | (2006.01) | |
| G01N 35/00 | (2006.01) | |

(52) U.S. Cl.
CPC ....... *G01N 35/04* (2013.01); *G01N 2030/025* (2013.01); *G01N 2030/8804* (2013.01); *G01N 2035/00346* (2013.01); *G01N 2035/0441* (2013.01)

(58) Field of Classification Search
CPC . G01N 2030/8804; G01N 2035/00346; G01N 2035/0441; G01N 2035/00356; G01N 35/00613; G01N 30/16; G01N 30/32; G01N 2001/2229; G01N 1/2226; G01N 30/8658; B01D 53/025; G01F 1/68
See application file for complete search history.

(56) References Cited

U.S. PATENT DOCUMENTS

| | | | | |
|---|---|---|---|---|
| 8,887,586 | B2* | 11/2014 | Henderson | G01M 3/3254 |
| | | | | 73/40.7 |
| 9,470,664 | B2* | 10/2016 | Dourdeville | G01R 33/44 |
| 10,054,569 | B2* | 8/2018 | Song | G01N 30/32 |
| 10,281,445 | B2* | 5/2019 | Aono | G01M 3/205 |
| 10,627,373 | B2* | 4/2020 | Song | G01N 30/20 |
| 11,515,135 | B1* | 11/2022 | Wiederin | G01N 35/1016 |
| 11,692,912 | B2* | 7/2023 | Wiederin | G01N 1/2035 |
| | | | | 73/23.2 |
| 2007/0184553 | A1* | 8/2007 | Hartlein | G01N 30/24 |
| | | | | 436/50 |
| 2012/0103068 | A1 | 5/2012 | Henderson | |
| 2015/0325097 | A1 | 11/2015 | Misra et al. | |

FOREIGN PATENT DOCUMENTS

| | | |
|---|---|---|
| JP | H1194811 A | 4/1999 |
| JP | 2011-017606 A | 1/2011 |
| JP | 2015179016 A | 10/2015 |
| WO | 2013080333 A1 | 6/2013 |

OTHER PUBLICATIONS

"International Search Report on PCT Application No. PCT/US2021/026556", mailed date Jul. 28, 2021, 10 pages.
Agilent Technologies Inc., "Agilent 7697A Headspace Sampler—Troubleshooting Guide", Jan. 31, 2012, 92 pages. <https://www.agilent.com/cs/library/usermanuals/Public/G4556-90018.pdf>.

* cited by examiner

METHODS AND SYSTEMS FOR SENSING HEADSPACE VIAL PRESENCE

CROSS-REFERENCE TO RELATED APPLICATION(S)

This application is a national stage filing under 35 U.S.C 371 of PCT application number PCT/US2021/026556, having an international filing date of Apr. 9, 2021, which claims the benefit of priority to U.S. Provisional Patent Application Ser. No. 63/021,822, filed May 8, 2020, the disclosures of which are hereby incorporated by reference in their entireties.

BACKGROUND OF THE INVENTION

In headspace gas chromatography, the contents of a sample vial are typically first heated, then pressurized, and the volatile contents are subsequently sampled. Once sampling is complete, the vial is ejected or removed from a sample probe. However, in some cases, the sample vial can fail to be successfully removed from the sample probe, which can lead to damage to the gas chromatography system, the sample vial, and the like.

Further, after sampling is complete, the vial is allowed to cool back to room temperature. The contents of the vial may still be under pressure, or possibly there could be a partial vacuum. Breakage of the vial can be dangerous depending on the contents of the vial.

SUMMARY

Systems and methods for sensing headspace vial presence are described herein. In one aspect, a gas chromatography system can include a sample probe; a fluid source in fluid communication with the sample probe; a pressure sensor in fluid communication with the sample probe; and a processor configured to: (a) execute an ejection procedure to remove a sample vial from the sample probe; (b) receive a set of signals from the pressure sensor; (c) detect whether the ejection procedure is successful from the set of signals; and (d) in response to the detecting, initiate one or more actions selected from the group of: a remediation and an alert.

This aspect can include a variety of embodiments. In one embodiment, the processor in step (c) is further configured to: determine a change in values within the set of signals; and determine a sample vial is removed from the sample probe from the change in values.

In another embodiment, the remediation can further include terminating chromatography functions if the processor detects a failed ejection procedure.

In another embodiment, a pressure reading of the set of signals can measure, during step (a), either below or within a predefined threshold or to atmospheric pressure when the ejection procedure is successful, and the predefined threshold is determined by the processor from a vial volume, a solvent composition, a headspace composition, a pressurization gas composition, flow path restrictions, flow rate or pressure measurements of a test vial, or a combination thereof.

In another embodiment, the processor in step (c) is further configured to: determine a change in a value does not occur within the set of signals; and determine a sample vial has either failed to be removed from the sample probe, or the sample probe is stuck in a septum of the sample vial, or the sample probe is clogged, from the set of signals.

In another embodiment, the processor in step (e) is further configured to: control a vial actuator to actuate a sample vial towards the sample probe in response to determining the ejection procedure failed; or control a vial rack to actuate, where the actuation occurs in response to determining the ejection procedure failed.

In another aspect, a gas chromatography system can include a sample probe; a fluid source in fluid communication with the sample probe; a pressure sensor in fluid communication with the sample probe; and a processor configured to: (a) execute an ejection procedure to remove a sample vial from the sample probe; (b) flow fluid via the fluid source to the sample probe during step (a); (c) receive a set of signals from the pressure sensor during step (b); (d) detect whether the ejection procedure is successful from the set of signals; and (e) in response to the detecting, initiate one or more actions selected from the group of: a remediation and an alert.

This aspect can include a variety of embodiments. In one embodiment, the gas chromatography system can further include a flow sensor in fluid communication with the sample probe, where a subset of the set of signals are received from the flow sensor.

In another embodiment, the processor in step (d) is further configured to: determine a change in values within the set of signals; and determine a sample vial is removed from the sample probe from the change in values.

In another embodiment, the processor in step (d) is further configured to: determine a rate of change within the set of signals; determine the rate of change is below a predefined threshold; and determine the ejection procedure was successful.

In another embodiment, the processor in step (d) is further configured to: determine a rate of change within the set of signals; determine the rate of change exceeds or is within a predefined threshold; and determine a sample vial has failed to be removed from the sample probe from the set of signals.

In another embodiment, the processor in step (d) is further configured to: determine a rate of change within the set of signals; determine the rate of change exceeds a predefined threshold; and determine, from the set of signals, the sample probe is either trapped in a septum of the sample vial or the sample probe is clogged. In some cases, the processor can be further configured to determine the predefined threshold from a composition of the fluid source, a composition of a sample of the sample vial, a volume of the sample vial, flow rate or pressure measurements of a test vial, or a combination thereof.

In another embodiment, the processor in step (e) is further configured to: control a vial actuator to actuate a sample vial towards the sample probe in response to determining the ejection procedure failed; or control a vial rack to actuate, where the actuation occurs in response to determining the ejection procedure failed.

In another embodiment, the gas chromatography system can further include a heater in thermal communication with a sample vial, where the heater is configured to generate a heated condition of the sample vial, where the processor is further configured to: receive a first set of signals from the pressure sensor; determine an initial pressure of the sample vial in the heated condition from the first set of signals; execute an extraction procedure of contents of the sample vial; receive a second set of signals from the pressure sensor after the extraction procedure; determine a second pressure of the sample vial; and control the fluid source or a vent in fluidic communication with the sample vial to revert the second pressure of the sample vial to the initial pressure.

In yet another aspect, a gas chromatography system can include a sample probe; a fluid source in fluid communication with the sample probe; a flow sensor in fluid communication with the sample probe; and a processor configured to: (a) execute an ejection procedure to remove a sample vial from the sample probe; (b) receive a set of signals from the flow sensor; (c) detect whether the ejection procedure is successful from the set of signals; and (d) in response to the detecting, initiate one or more actions selected from the group of: a remediation and an alert.

This aspect can include a variety of embodiments. In one embodiment, the processor in step (c) is further configured to: determine a change in values within the set of signals; and determine a sample vial is removed from the sample probe from the change in values.

In another embodiment, the system attempts to maintain a constant pressure level in the sample probe during steps (a) and (b).

In another embodiment, the remediation can further include terminating chromatography functions if the processor detects a failed ejection procedure.

In another embodiment, the processor in step (c) is further configured to: determine a change in a value does not occur within the set of signals; and determine a sample vial has either failed to be removed from the sample probe, or the sample probe is stuck in a septum of the sample vial, or the sample probe is clogged, from the set of signals.

In another embodiment, the processor in step (e) is further configured to: control a vial actuator to actuate a sample vial towards the sample probe in response to determining the ejection procedure failed; or control a vial rack to actuate, where the actuation occurs in response to determining the ejection procedure failed.

In yet another aspect, a gas chromatography system can include a sample probe; a fluid source in fluid communication with the sample probe; a flow sensor in fluid communication with the sample probe; and a processor configured to: (a) execute an ejection procedure to remove a sample vial from the sample probe; (b) flow fluid via the fluid source to the sample probe; (c) receive a set of signals from the flow sensor during step (b); (d) detect whether the ejection procedure is successful from the set of signals; and (e) in response to the detecting, initiate one or more actions selected from the group of: a remediation and an alert.

This aspect can include a variety of embodiments. In one embodiment, the gas chromatography system can further include a pressure sensor in fluid communication with the sample probe, where a subset of the set of signals are received from the pressure sensor.

In another embodiment, the processor in step (e) is further configured to: control a vial actuator to actuate a sample vial towards the sample probe in response to determining the ejection procedure failed; or control a vial rack to actuate, where the actuation occurs in response to determining the ejection procedure failed.

BRIEF DESCRIPTION OF THE DRAWINGS

For a fuller understanding of the nature and desired objects of the present invention, reference is made to the following detailed description taken in conjunction with the accompanying drawing figures wherein like reference characters denote corresponding parts throughout the several views.

DEFINITIONS

The instant invention is most clearly understood with reference to the following definitions.

As used herein, the singular form "a," "an," and "the" include plural references unless the context clearly dictates otherwise.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

As used in the specification and claims, the terms "comprises," "comprising," "containing," "having," and the like can have the meaning ascribed to them in U.S. patent law and can mean "includes," "including," and the like.

Unless specifically stated or obvious from context, the term "or," as used herein, is understood to be inclusive.

The term "set," as used in the specification and claims, can include one or a plurality of objects contained within.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 (as well as fractions thereof unless the context clearly dictates otherwise).

DETAILED DESCRIPTION OF THE INVENTION

Gas Chromatography System

Figure 1:
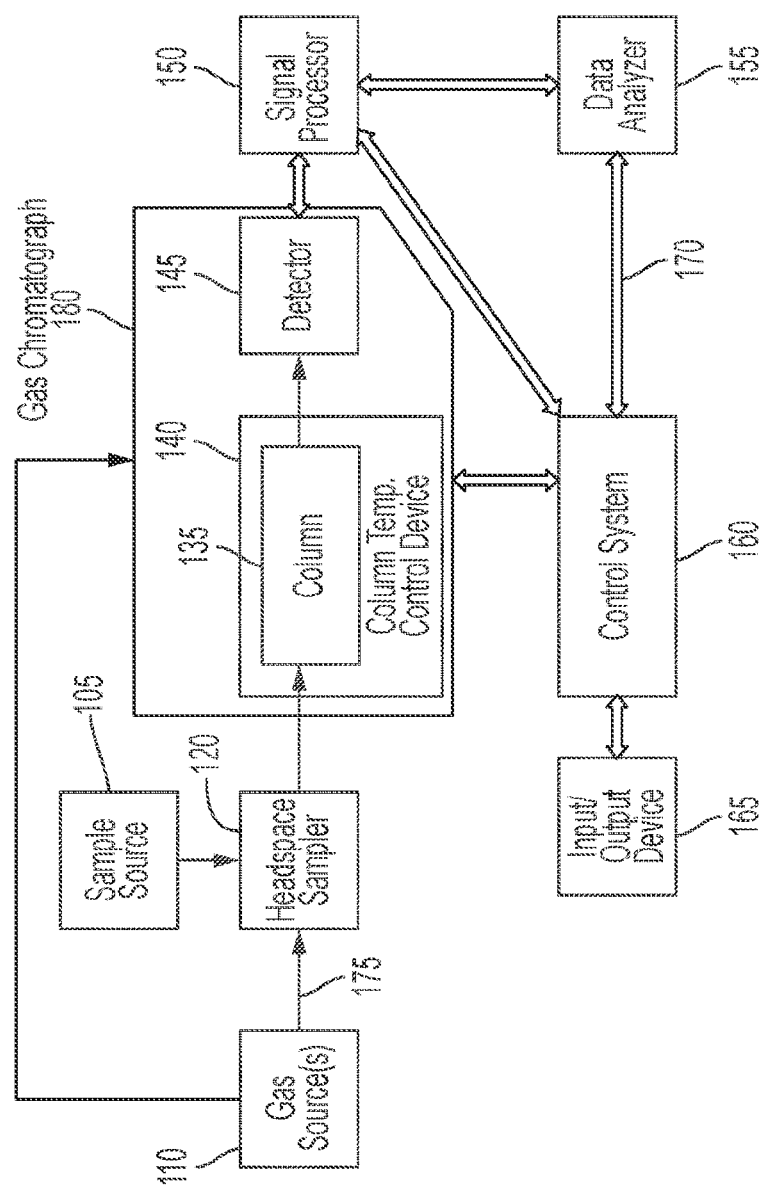
FIG. 1 depicts a gas chromatography system according to an embodiment of the claimed invention.

The methods described herein can be implemented by, and the systems described herein can be a part of, a gas chromatography system. An exemplary gas chromatography system is illustrated in FIG. 1. The gas chromatography system can inject, vaporize, separate, and detect components of a sample. Fluid flow through the system is depicted as single-lined arrows, such as arrow 175. However, one skilled in the art will understand that the invention described herein is not limited to the specific embodiment of the gas chromatography system depicted in FIG. 1, nor to the specific component embodiments described in FIGS. 2-8, and the invention described herein can be performed by various gas chromatography systems and various system designs. For example, the gas chromatography system can include one or more samplers, inlets, columns, detectors, valves, gas control devices, heaters, etc.

Sample Source

Headspace sample source 105 can contain any sample comprised of volatile components that partially vaporize and establish equilibrium with their less-volatile surroundings. Based on typical temperatures associated with headspace sample analysis, a significant number of chemical analytes are available as the sample source 105. In some cases, the sample source 105 can be stored prior to a source extraction, such as in a vial or container. The vial or container may be sealed (substantially gas-tight) with a septum pressed onto the container using a cap or other method resulting in a substantially gas-tight seal. The headspace sampler 120 receives the sample source 105 and establishes equilibrium between the volatile portion of the sample contained within the sample source 105 and less-volatile components within the sample source 105. The seal of the sample source 105 at equilibrium can be punctured by a syringe, needle, or other sample probe that provides a conduit through which to transfer an aliquot of the volatile portion of the headspace within the sample source 105 to a gas chromatograph 180 where the aliquot will be separated into its constituent parts for identification and/or quantitation.

Figure 6:
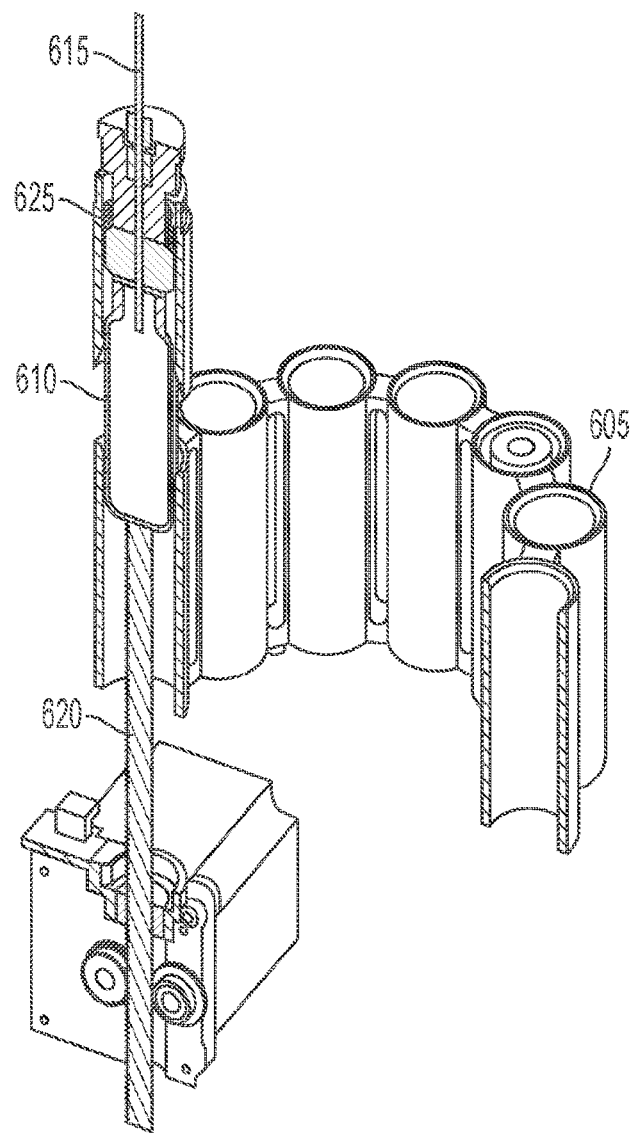
FIGS. 6 and 7 depict a vial-sampling mechanism for a sample vial according to embodiments of the claimed invention.

The headspace sampler 120 in some cases can include a device for retrieving a stored sample and positioning the sample to be extracted from a container. For example, FIG. 6 depicts a vial-sampling mechanism for a sample including a rack 605 for positioning a sample vial 610 adjacent to a sample probe 615. In this example, the rack 605 is a circular carousel that actuates rotationally and orthogonally to the length of the probe 615. However, one skilled in the art will appreciate that other forms of retrieving and/or positioning a sample vial for sample extraction can be implemented within the scope of the system, such as a linear rack, any other vial-handling robotic system, and the like. Further, the rack 605 can include a set of cartridges, where each cartridge is capable of holding a sample vial.

The headspace sampler 120 can also include heating elements (e.g., resistive (Ohmic or Joule) heaters) for controlling the temperature of the sample prior to and/or during extraction. For example, the entire rack 605 can be housed within a heated region. In headspace gas chromatography analysis, the sample probe can extract the sample through a headspace of the vial in which the sample is stored. In some cases, the temperature of liquid or solid samples within the sample vial can be increased to generate the headspace to be sampled. The heating elements can accomplish this by increasing the temperature of the sample source 105. In other cases, the sample can exist in a gaseous phase at room temperature, and thus heating the sample vial may not be needed. Typical temperatures can range from ambient temperature to 300° C.

In order to extract the sample from the sample vial for analysis and as part of an extraction procedure, the carousel 605 can rotate until the sample vial 610 is positioned to be aligned with the sample probe 615. Then, an actuator 620 can actuate towards the sample probe 615. In some cases, the actuator 620 can include a lifter rod having a predefined length, where the length is parallel to the length of the sample probe 615. However, one skilled in the art will appreciate that other types of actuators can be implemented to actuate towards and/or away from a sample probe. As the actuator 620 actuates towards the sample probe 615, the actuator 620 can pass through a cavity in the bottom of the cartridge holding the sample vial 610 and force the sample vial 610 towards the sample probe 615. The sample probe 615 can pierce the top of the sample vial 610 (e.g., pass through a septum of the vial 610), such that the sample probe 615 accesses the contents stored in the sample vial 610. Note that this is only one embodiment of a mechanism to cause the sample probe to access the contents stored in the sample vial. Additional mechanisms, including different combinations of motors, motion converting devices, etc. can perform this task. Additionally, instead of moving the sample vial and keeping the sample probe stationary, the relative motion between the sample probe and sample vial may be a result of the sample probe moving with the sample vial also moving or remaining stationary.

The headspace sampler 120 can include a series of flow paths connected to the gas source 110 and gas chromatograph 180. The flow paths provide fluidic communication to extract an amount of sample from the sample source and transfer it to the gas chromatograph for analysis. Further, proportional valve(s), switching valve(s), and/or a six-port valve can control which flow path(s) are connected at any given time. An exemplary headspace sampler flow path is depicted in FIG. 2.

Figure 2:
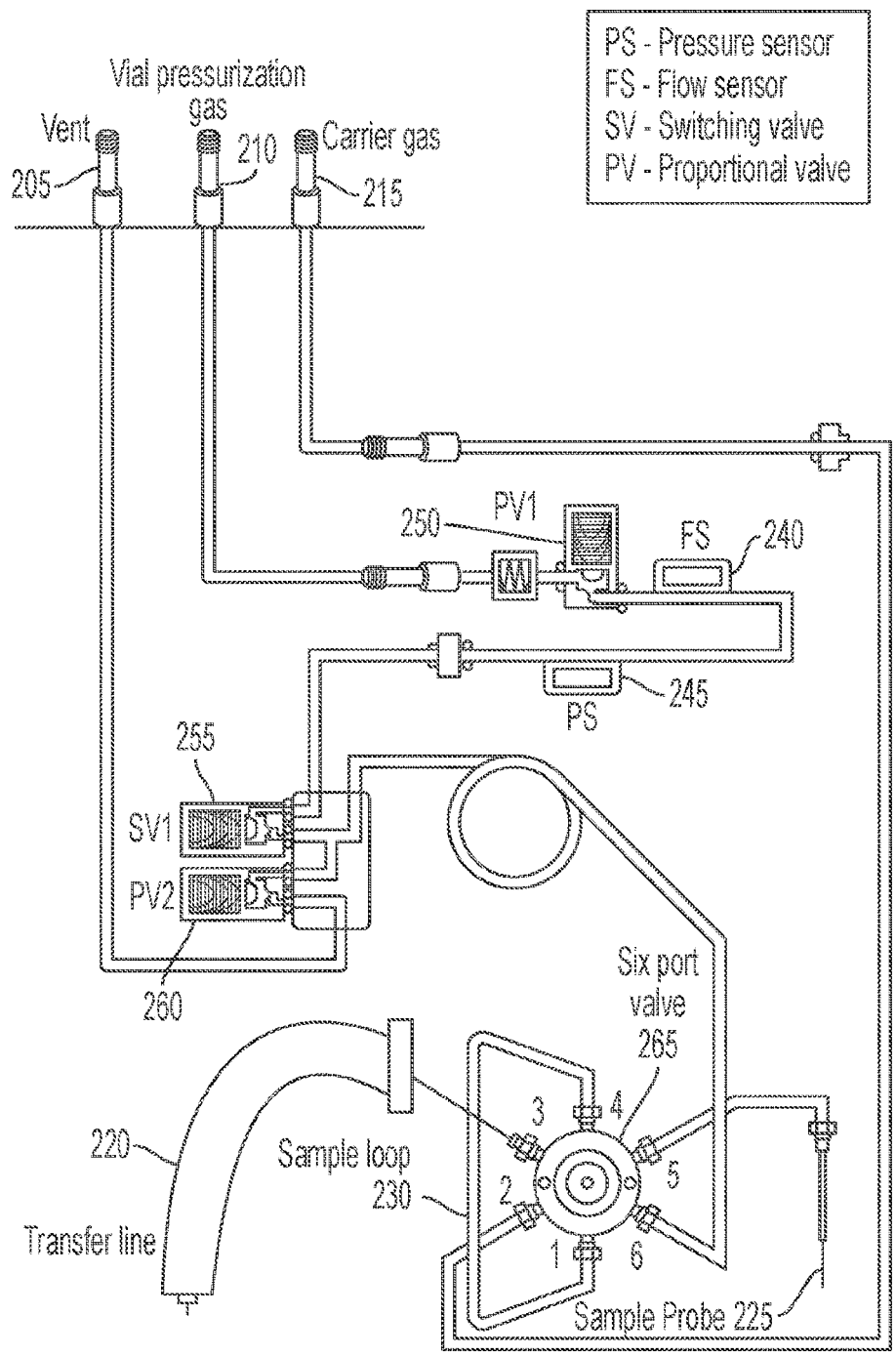
FIG. 2 depicts a flow path of a headspace sampler according to an embodiment of the claimed invention.

The headspace sampler flow path embodiment illustrated in FIG. 2 can include various input/output channels. For example, the headspace sampler can include a flow path connected to a vent 205, a flow path connected to a vial pressurization gas source 210, a flow path connected to a carrier gas source 215, a flow path connected to a transfer line 220, and a flow path connected to a sample probe 225. Vial pressurization gas source 210 and carrier gas source 215 may be part of gas source 110 of FIG. 1. One or more of these flow paths may contain a sample loop, such as sample loop 230. Alternately, there may be a sample trap in place of or in addition to the sample loop.

Various sensors and valves can be integrated into the headspace sampler flow path. The integrated sensors and valves can assist in controlling and managing the flow in the headspace sampler. For example, sensor(s) and valve(s) (not shown) can control the flow of carrier gas into carrier gas source 215. A flow sensor 240, a pressure sensor 245, and a proportional valve (PV1) 250 can be coupled to the flow path connected to the vial pressurization gas source 210. Various types of flow sensors 240 may be used including thermal mass flow sensors.

Additionally, a switching valve 255 can couple the flow path connected to the vial pressurization source 210 to a six-port valve 265. A proportional valve (PV2) 260 can couple the flow path connected to the vent 205 to the six-port valve 265 and/or the vial pressurization gas source 210. These valves, along with the valves described above and the six-port valve, can control the introduction and extraction of various gases into the headspace sampler.

One or more components of the flow path may be heated, for example, the sample probe 225, six-port valve 265, sample loop 230, and/or transfer line 220. Typical temperatures range from ambient to 300° C.

Figure 3:
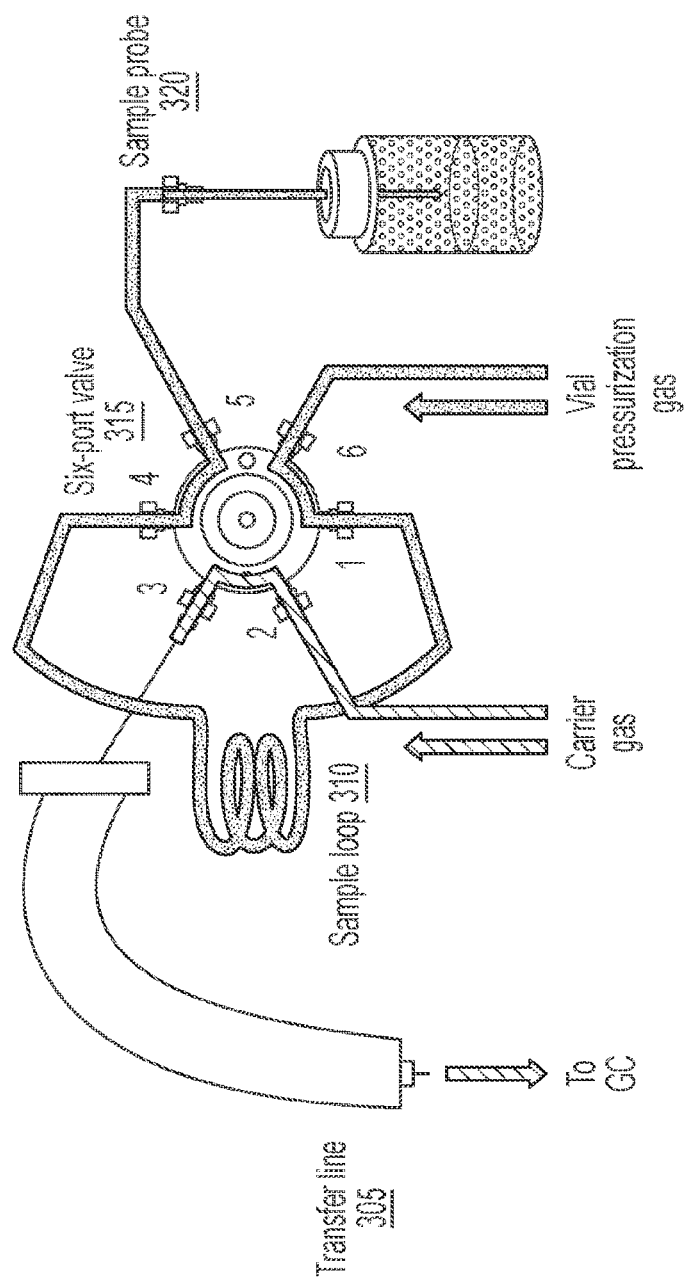
FIG. 3 depicts a vial pressurization flow path configuration for a headspace sampler according to an embodiment of the claimed invention.

The headspace sampler can, in some cases, pressurize the sample vial prior to extracting the sample. Typical pressures can range from ambient to 75 psig (517 kPa). A vial pressurization flow path is illustrated in FIG. 3. During the pressurization stage, the six-port valve and valves depicted in FIG. 2 can be oriented to connect the sample probe to the vial pressurization gas source 210. Pressurization gas can flow into the flow path (e.g., through the sample loop 310 and six-port valve 315), through the sample probe 320, and into the sample vial. The gas flow can increase the pressure in the sample vial and the connected flow path. Typical gases used to pressurize the vial can include Helium and Nitrogen. Further, carrier gas can flow through a flow path coupled to the transfer line 305 and into the gas chromatograph.

Figure 4:
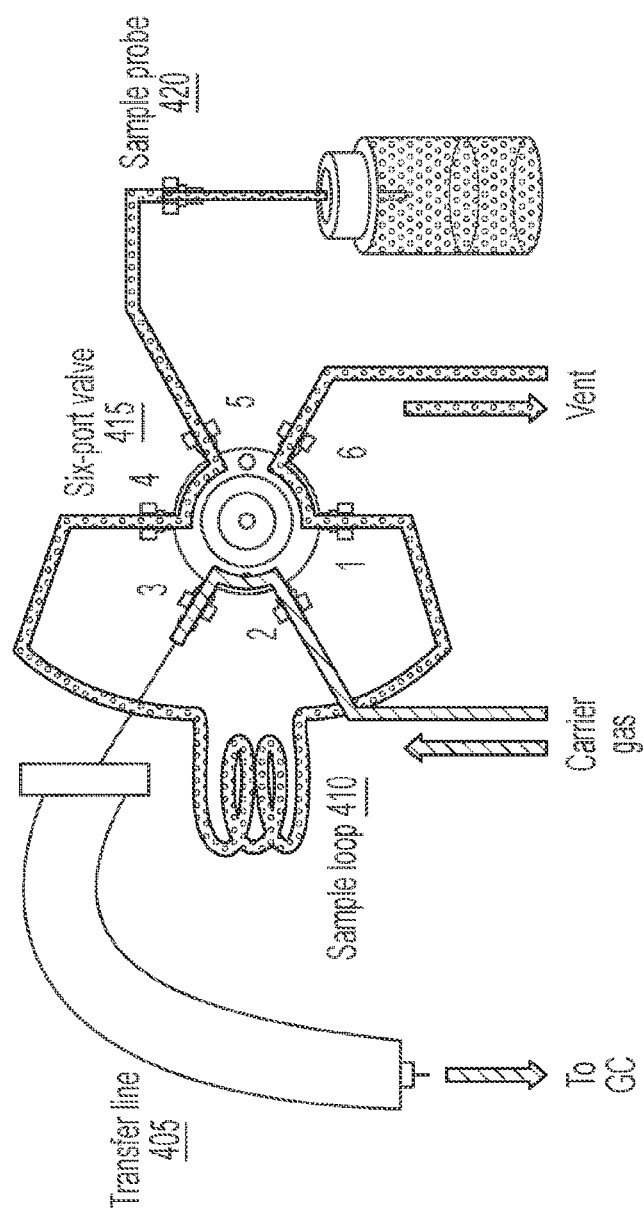
FIG. 4 depicts a sample loop filling flow path configuration for a headspace sampler according to an embodiment of the claimed invention.

The headspace sampler 120 can then implement a sample-loop-filling flow path, an example of which is depicted in FIG. 4. The six-port valve 415 can be oriented to connect the sample probe 420 to the vent, which can be at a lower pressure than the vial (e.g., atmospheric pressure). Venting the sample probe can extract the sample from the sample vial and into the sample loop flow path 410. Alternatively, the sample probe can extract the sample from the sample vial and into a trap. As the headspace in the sample vial vents into the sample loop, the pressure in the sample vial can decrease. Additionally, the transfer line 405 can be coupled to the carrier gas input via the six-port valve 415.

Figure 5:
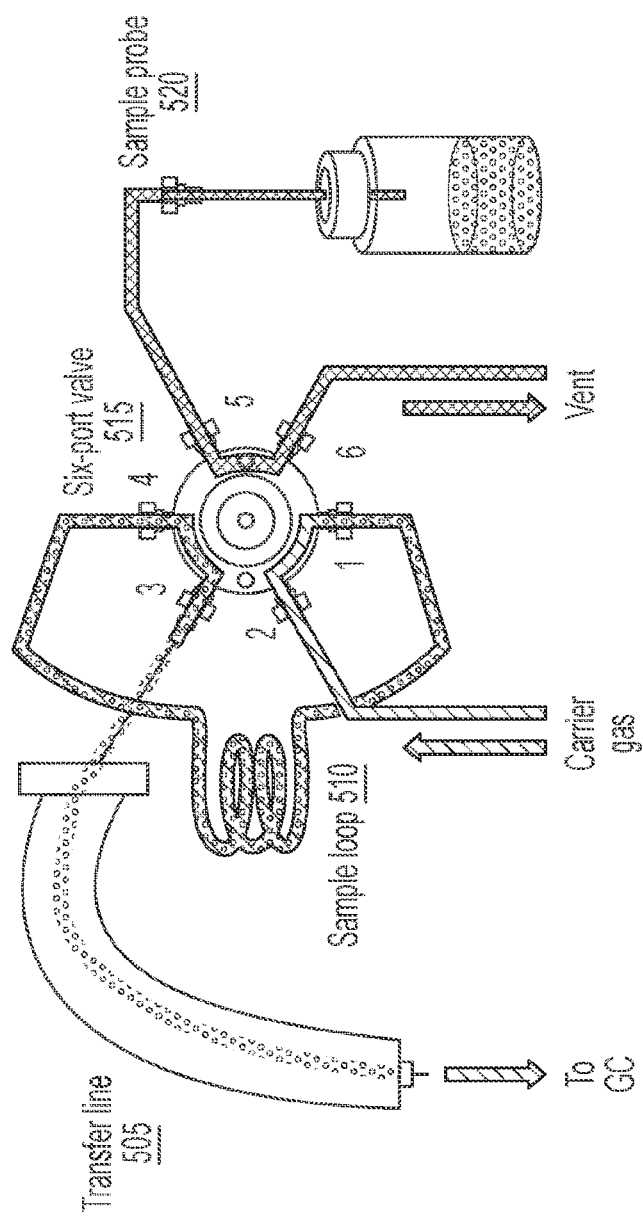
FIG. 5 depicts an injection flow path configuration for a headspace sampler according to an embodiment of the claimed invention.

The headspace sampler 120 can then implement an injection flow path, an example of which is illustrated in FIG. 5. The six-port valve 515 can be oriented to connect the carrier gas source to the transfer line 505 via the sample loop 510. Typical carrier gases can include Hydrogen, Helium, Nitrogen, and Argon-Methane. The carrier gas can flow into the flow path, forcing the sample in sample loop 510 into the transfer line 505. The sample can flow from the transfer line 505 to a gas chromatograph (GC) for analysis, such as gas chromatograph 180 of FIG. 1. In some cases, the six-port valve orientation can also connect the sample probe 520 to the vent (e.g., vent 205 of FIG. 2). In these cases, the vent can vent the sample vial coupled to the sample probe (e.g., modifying the headspace pressure of the vial to ambient or to a lower pressure than was achieved during sampling of the vial headspace).

Column

Separation of the sample components can occur in the column 135 of gas chromatograph 180. The column 135 can have a coating (e.g., a stationary phase) on the inner surface that interacts with different sample components differently. The interactions can be physical in nature (e.g., adsorption, "solvation," sieving, and the like) rather than chemical. An exemplary column can be a capillary tube (e.g., 5 to 100 m long, 0.1 to 0.5 mm in diameter) with a coating of a suitable polymer film on its walls. The column can also contain particles that can interact with the sample either directly or due to a coating on the particles. In either case, as the sample components go through the column, some components can interact more strongly than others with the stationary phase and are retained for longer times. The sample components thus are carried by the carrier gas to the detector end of the column 135 with different exit times depending on the differences in interaction with the stationary phase.

Column Temperature Control

The sample component interaction with the column can be adjusted by controlling the temperature of the column 135 (e.g., via a column temperature control device 140 of gas chromatograph 180). In some samples, some components can interact minimally with the column 135 at a given temperature, while other components can be retained indefinitely at that same temperature. Thus, the column temperature control device 140 controls the column temperature in a precise (and repeatable) way while the sample components are migrating through the column 135. This temperature control can involve increasing the temperature of the column 135 during sample elution. When the last component has eluted from the column, the temperature can be returned to the starting temperature before the next sample is introduced. For some samples, a desired starting temperature can be below room temperature; for some samples, the desired starting temperature can be at or near room temperature; and for other samples, the desired starting column temperature can be higher than room temperature.

Detector

The separated components of the sample can be received or identified by a detector 145 of gas chromatograph 180. The detector 145 can provide a change in an electrical signal when some or all sample components elute from the column 135.

Signal Processor & Data Analyzer

A signal processor 150 can receive electrical signals generated by the detector 145 and process the signal. The signal processor 150 can be an analog-to-digital converter that converts the analog output of the detector 145 into a digital signal that can be used by the data analyzer 155. A data analyzer 155 can convert the gas chromatography signals received from the signal processor 150 into compound identification and calibrated amounts. In some cases, the signal processor 150 and/or the data analyzer can be external to the gas chromatograph 180.

Input/Output Device

The input/output device 165 can receive input for and/or display output from, the gas chromatography system. The input/output device 165 can be analog switches, a keyboard, and display. Alternatively, set-point input and system monitoring can occur via an external computer with appropriate software. In some cases, the input-output device 165 can be housed on the headspace sampler, various parts of the gas chromatograph, or external to the chromatograph.

Control System

Control system 160 can be an electronic device programmed to control the operation of the gas chromatography system to achieve a desired result. The control system 160 can be programmed to autonomously carry out a gas chromatography regimen without the need for input (either from feedback devices or users) or can incorporate such inputs. The principles of how to use feedback (e.g., from a temperature sensor) in order to modulate operation of a component are described, for example, in Karl Johan Astrom & Richard M. Murray, *Feedback Systems: An Introduction for Scientists & Engineers* (2008).

Figure 8:
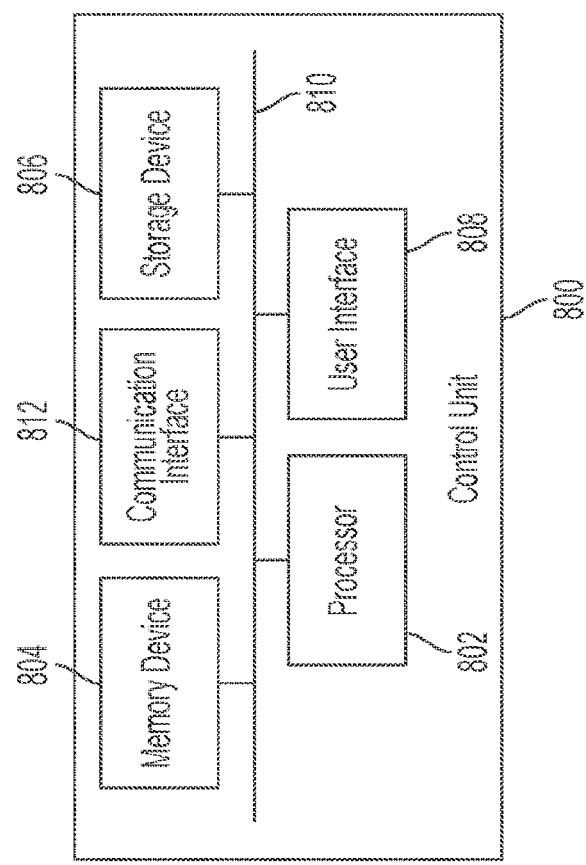
FIG. 8 depicts a control system of a gas chromatography system according to an embodiment of the claimed invention.

Control system 160 can be a computing device such as a microcontroller (e.g., available under the ARDUINO® OR IOIO™ trademarks), general purpose computer (e.g., a personal computer or PC), workstation, mainframe computer system, and so forth. An exemplary control system is illustrated in FIG. 8. The control system 800 can include a processor device (e.g., a central processing unit or "CPU") 802, a memory device 804, a storage device 806, a user interface 808, a system bus 810, and a communication interface 812.

Processor 802 can be any type of processing device for carrying out instructions, processing data, and so forth.

Memory device 804 can be any type of memory device including any one or more of random access memory ("RAM"), read-only memory ("ROM"), Flash memory, Electrically Erasable Programmable Read Only Memory ("EEPROM"), and so forth.

Storage device 806 can be any data storage device for reading/writing from/to any removable and/or integrated optical, magnetic, and/or optical-magneto storage medium, and the like (e.g., a hard disk, a compact disc-read-only memory "CD-ROM", CD-ReWritable CDRW," Digital Versatile Disc-ROM "DVD-ROM", DVD-RW, and so forth).

Storage device 806 can also include a controller/interface for connecting to system bus 810. Thus, memory device 804 and storage device 806 are suitable for storing data as well as instructions for programmed processes for execution on processor 802.

User interface 808 can include a touch screen, control panel, keyboard, keypad, display or any other type of interface, which can be connected to system bus 810 through a corresponding input/output device interface/adapter.

Communication interface 812 can be adapted and configured to communicate with any type of external device, or with other components of the gas chromatography system. For example, double-lined arrows, such as arrow 170 of FIG. 1, illustrate electronic communication between the control system 160 and other components of the gas chromatography system. Communication interface 812 can further be adapted and configured to communicate with any system or network, such as one or more computing devices on a local area network ("LAN"), wide area network ("WAN"), the Internet, and so forth. Communication interface 812 can be connected directly to system bus 810 or can be connected through a suitable interface.

Control system 800 can, thus, provide for executing processes, by itself and/or in cooperation with one or more additional devices, that can include algorithms for controlling components of the gas chromatography system in accordance with the claimed invention. Control system 800 can be programmed or instructed to perform these processes according to any communication protocol and/or programming language on any platform. Thus, the processes can be embodied in data as well as instructions stored in memory device 804 and/or storage device 806 or received at user interface 808 and/or communication interface 812 for execution on processor 802.

In some cases, the control system for the headspace sampler and gas chromatograph can be the same or different control systems, and the control system can be housed on the headspace sampler, gas chromatograph, or both, or on an external device.

Sample Vial Removal

Figure 7:
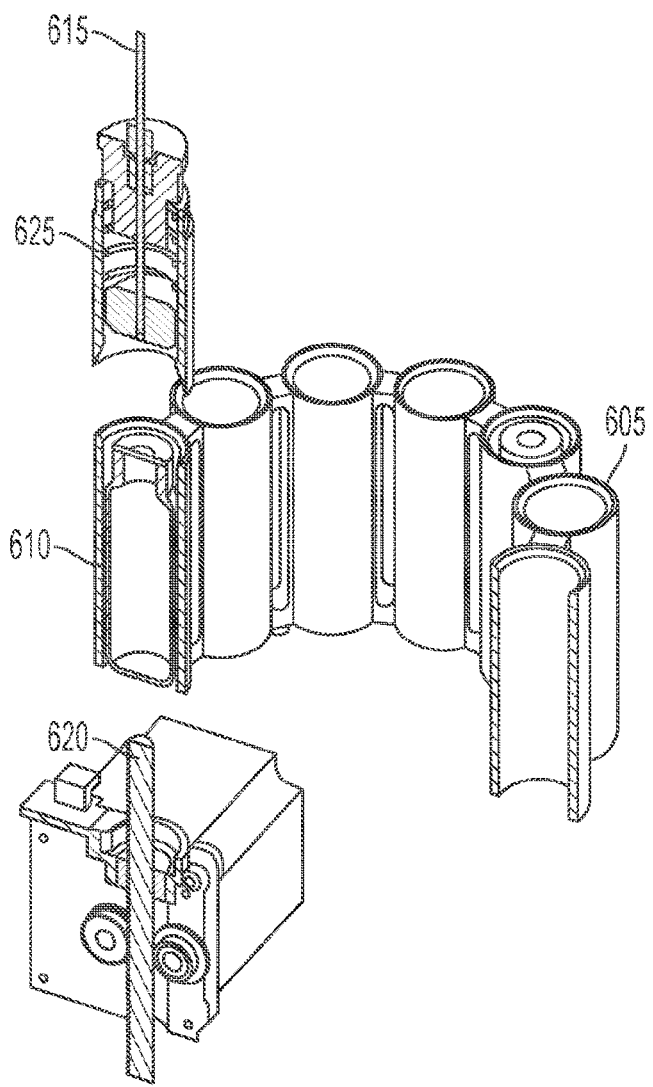

After the sample is extracted via an extraction procedure from the sample vial, the gas chromatography system can attempt to remove the sample vial from the sample probe. As previously discussed, FIG. 6 depicts an actuator 620 moving the sample vial 610 upwards, allowing for the sample probe 615 to access the contents of the sample vial 610. FIG. 7 depicts successful removal of the sample vial 610 from the sample probe 615. The actuator 620 can actuate distally away from the sample probe 615. In some cases, the actuator 620 can actuate at a predefined rate or rates for a controlled descent away from the sample probe 615. Further, the sample probe 615 can include a compression spring (shown in FIG. 7). The compression spring can compress when the sample probe 615 is in a position to access the contents of the sample vial 610 (e.g., as shown in FIG. 6). When the actuator 620 is retracted away from the sample probe 615, the compression spring can decompress. This decompression can initiate a distal force away from the sample probe 615, thereby forcing the sample vial 610 away from the sample probe 615. FIG. 7 illustrates a compression spring 625 in a decompressed mode. Further, one skilled in the art will appreciate that the compression spring depicted in FIGS. 6 and 7 is just an example of means for removing a sample vial in the sample vial holder, and other forms of providing distal force away from the sample probe can be used by the gas chromatography systems discussed herein (e.g., gravity, elastomers, pistons, fluid bladders, Belleville washers, etc.).

In some cases, however, the sample vial can fail to be removed from the sample probe. For example, the sample probe can be trapped with the opening of the sample probe within the headspace of the sample vial or within a septum of the sample vial. This may be due to friction between the sample probe and septum, low force in the ejector spring, friction between the vial and nearby components, mispositioning of the vial rack or other alignment issues, or other reasons. In some cases, the sample vial can partially be removed from the sample probe (e.g., the vial is partially repositioned back within the cartridge of the carousel). In the example mechanism of FIG. 7, if the sample vial 610 becomes stuck on the sample probe, the actuator 620 is still able to fully retract to its resting position. Therefore, simply sensing the position of the lifter rod using encoders or other position sensors known in the art is insufficient for determining if the sample vial has been removed from the sample probe. These failed removal attempts can cause significant issues with a gas chromatography system, as conventional systems can fail to recognize a vial has failed to be successfully removed from the probe and continue normal system processes (e.g., prepping the system for another chromatography run, attempting to actuate another sample vial to the sample probe, etc.). An unidentified removal failure can ultimately result in damage to the gas chromatography system, a broken vial, additional maintenance, and the like.

Sensing Headspace Vial Presence

A gas chromatography system can be configured to sense whether a sample vial is present on a sample probe. After a sample is extracted from a sample vial, the gas chromatography system can utilize a fluid parameter sensor of a flow path to detect parameter values within the respective flow path. Subsequently, the gas chromatography system can identify from the sensed parameter values whether: a vial remains on the sample probe, the vial is successfully removed from the probe, and the like. In some cases, the gas chromatography system can further configure the headspace sampler (e.g., the six-port valve, switching valves, proportional valves, and the like) to connect the sample probe to one of the configured flow paths, such as the vial pressurization flow path depicted in FIG. 3. The following example relies on the physical components and flow paths depicted in FIGS. 1 and 2. However, one skilled in the art will understand that the invention described herein can be implemented by a multitude of gas chromatography systems, in particular, those systems with differing flow path configurations and fluid parameter sensor locations or presence. For example, a system including a pressure sensor and/or flow sensor in fluidic communication with the sample probe can implement the techniques described herein.

Flow Path Configuration

A sensor of the gas chromatography system can monitor the pressure and/or flow rate within the flow path(s) of the headspace sampler. The headspace sampler can be configured to provide at least one of the pressure or flow rate sensors of the gas chromatography system access to the flow path connected to the sample probe. For example, in FIG. 2, the headspace sampler can be configured to open switching valve 255 to provide access of the flow sensor 240 and/or the pressure sensor 245 to pressure and/or flow rate measurements of the flow path fluidically connected to the sample probe.

Following the above example, the headspace sampler can be configured to use proportional valve 250 and/or proportional valve 260 of FIG. 2 to modify the pressure or flow rate of gas in the flow path connected to the sample probe. Feedback from sensors, such as flow sensor 240 and pressure sensor 245 can be used to control the valves.

Passive Pneumatic Monitoring for Vial Presence

The gas chromatography system can detect whether a vial is successfully removed from the probe 225 by taking measurements during a vial ejection procedure.

After retrieving the sample from the sample vial or aborting the sample retrieval, the gas chromatography system can attempt to eject the sample vial from the sample probe. For example, as discussed above in reference to FIGS. 6 and 7, the lifter rod can actuate distally away from the sample probe.

After retrieving the sample from the sample vial, the gas chromatography system may increase the pressure of the vial, decrease the pressure of the vial, or leave the pressure of the vial substantially the same as the pressure at the end of the loop filling, such that at the start of the ejection procedure, the vial is pressurized at a non-ambient pressure. During the ejection procedure, the sensors coupled to the sample probe flow path can measure parameters such as pressure and/or flowrate through the flow path. In some cases, the gas chromatography system can then compare the measurements taken during the ejection procedure when the vial is still expected to be on the sample probe (e.g., near the start of the ejection procedure) to measurements taken during the ejection procedure when the vial is expected to have been removed from the sample probe (e.g., near the end of the ejection procedure). The time at which the vial is expected to have been removed from the sample probe can be based on time elapsed since the start of the ejection attempt, the lifter position as monitored by encoders or other position sensors, etc. In other cases, the gas chromatography system can compare the measurements taken during the ejection procedure when the vial is expected to have been removed from the sample probe (e.g., near the end of the ejection procedure) to a predefined value or thresholds (e.g., approximately ambient pressure, etc.). In other cases, the gas chromatography system can look for a change in measurement values (e.g., a step change, change above a threshold, etc.) during the ejection procedure. The measurement values sensed by the sensors can be dependent upon whether the sample vial is successfully ejected from the sample probe. If the vial is successfully ejected from the sample probe, the flow path fluidically connected to the sample probe will be open to atmospheric pressure rather than contained within a pressurized vial.

For example, the sample probe can be fluidically connected to a pressure sensor, have substantially no gas flowing through the sample probe, and have the vial pressurized to a pressure above ambient at the start of the ejection procedure. In the example flow path shown in FIG. 2, this may be achieved by closing proportional valves 250 and 260, opening switching valve 255, and orienting six-port valve 265 such that the sample probe is fluidically connected to pressure sensor 245. If the sample vial is successfully removed from the sample probe, a pressure sensor (for example, pressure sensor 245) can sense a change in pressure (e.g., a decreasing change) as the flow path fluidically connected to the sample probe becomes open to atmospheric pressure where the initial values of the sensed parameter occur during the sensing when the vial is still expected to be on the sample probe. This change in pressure occurs due to the pressure sensor transitioning from being fluidically connected to the pressurized environment inside the sample vial (headspace) to being open to the atmosphere as the sample vial is removed from the sample probe.

As another example, the sample probe can be fluidically connected to a flow sensor and a pressure sensor, have gas flowing through the sample probe, and have the vial pressurized to non-ambient pressure at the start of the ejection procedure. The flow of gas may be substantially constant. In the example flow path shown in FIG. 2, this may be achieved by opening switching valve 255 and, optionally, opening proportional valve 260, and orienting six-port valve 265 such that the sample probe is fluidically connected to pressure sensor 245 and flow sensor 240. Flow sensor 240 can be used to control the flow through the flow path by controlling proportional valve 250. If the sample vial is successfully removed from the sample probe, a pressure sensor (e.g., pressure sensor 245) can sense a change in pressure (e.g., a decreasing change) as the flow path fluidically connected to the sample probe becomes open to atmospheric pressure where the initial values of the sensed parameter occur during the sensing when the sample vial is still expected to be on the sample probe (e.g., the sample probe is fluidically connected to the inside of the pressurized sample vial). Due to gas flowing through the flow path, the pressure sensed by pressure sensor 245 may be higher than atmospheric pressure due to any fluidic restriction in the flow path between pressure sensor 245 and the opening in the sample probe.

Alternatively, as another example, the sample probe can be fluidically connected to a flow sensor and a pressure sensor, with the pressure in the sample vial controlled to a setpoint during the ejection procedure. In the example flow path shown in FIG. 2, this may be achieved by closing proportional valve 260, opening switching valve 255, and orienting six-port valve 265 such that the sample probe is fluidically connected to pressure sensor 245 and flow sensor 240. Proportional valve 250 can be used to control the pressure in the sample vial fluidically connected to the sample probe by regulating the vial pressurization gas according to a setpoint for pressure sensor 245. If the sample vial is successfully removed from the sample probe, the flow rate will increase (e.g., an increasing change), as measured by the flow sensor 240, when the sample vial is removed from the sample probe as the controller attempts to maintain the pressure of the flow path connected to the sample probe as the flow path is opened to atmospheric pressure, where the initial values of the sensed parameter occur during the sensing when the vial is still expected to be on the sample probe (e.g., the sample probe is fluidically connected to the headspace of the pressurized sample vial). Depending on the pressure setpoint, the restriction of the connected flow path, and the viscosity of the gas, the headspace sampler may be unable to maintain the pressure setpoint. In some cases, this may also be an indication that the vial is successfully ejected.

Figure 9:
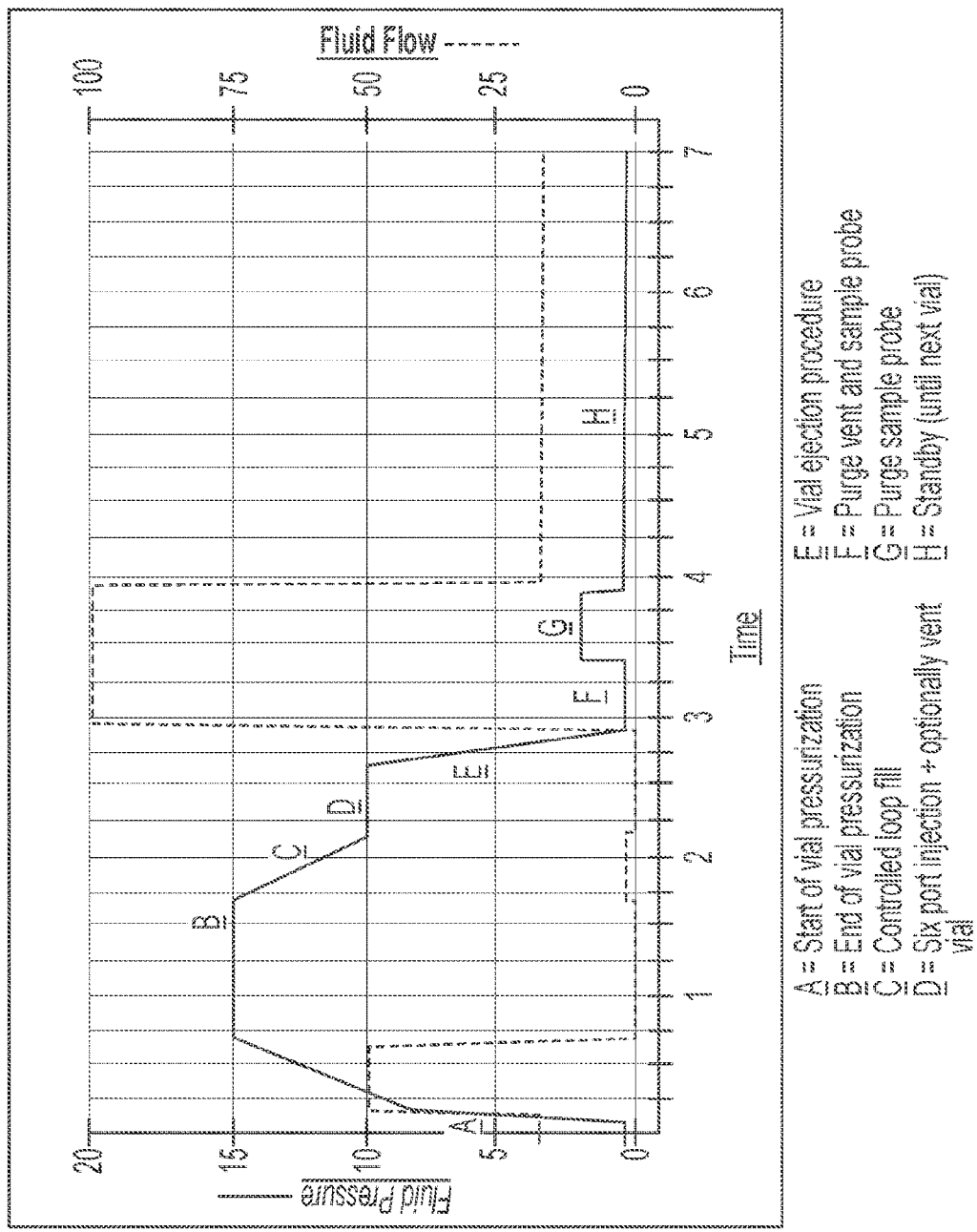
FIGS. 9-14 depict graphs of pressure and flow rate measurements of a headspace sampler according to embodiments of the claimed invention.
Figure 10:
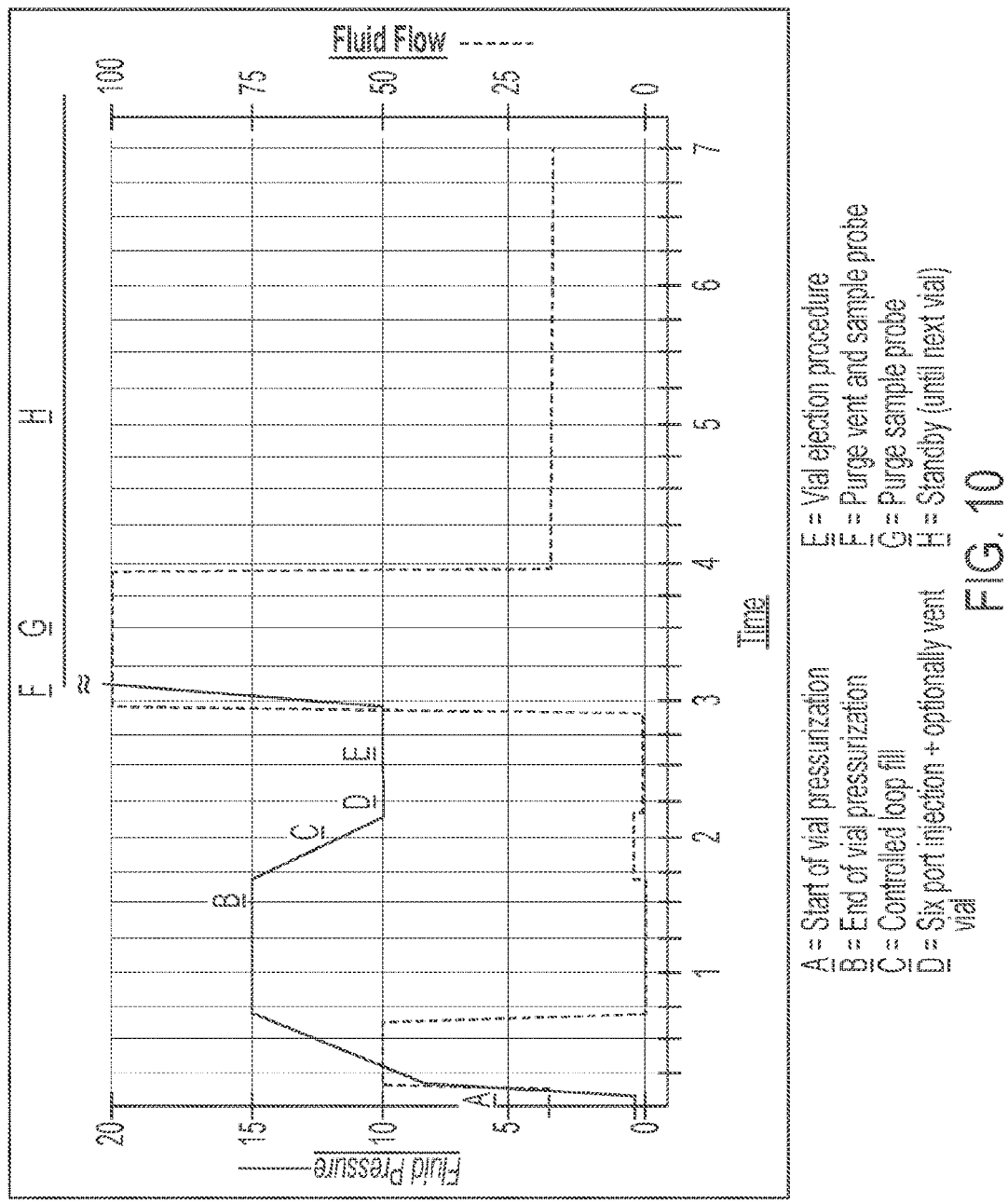
Figure 11:
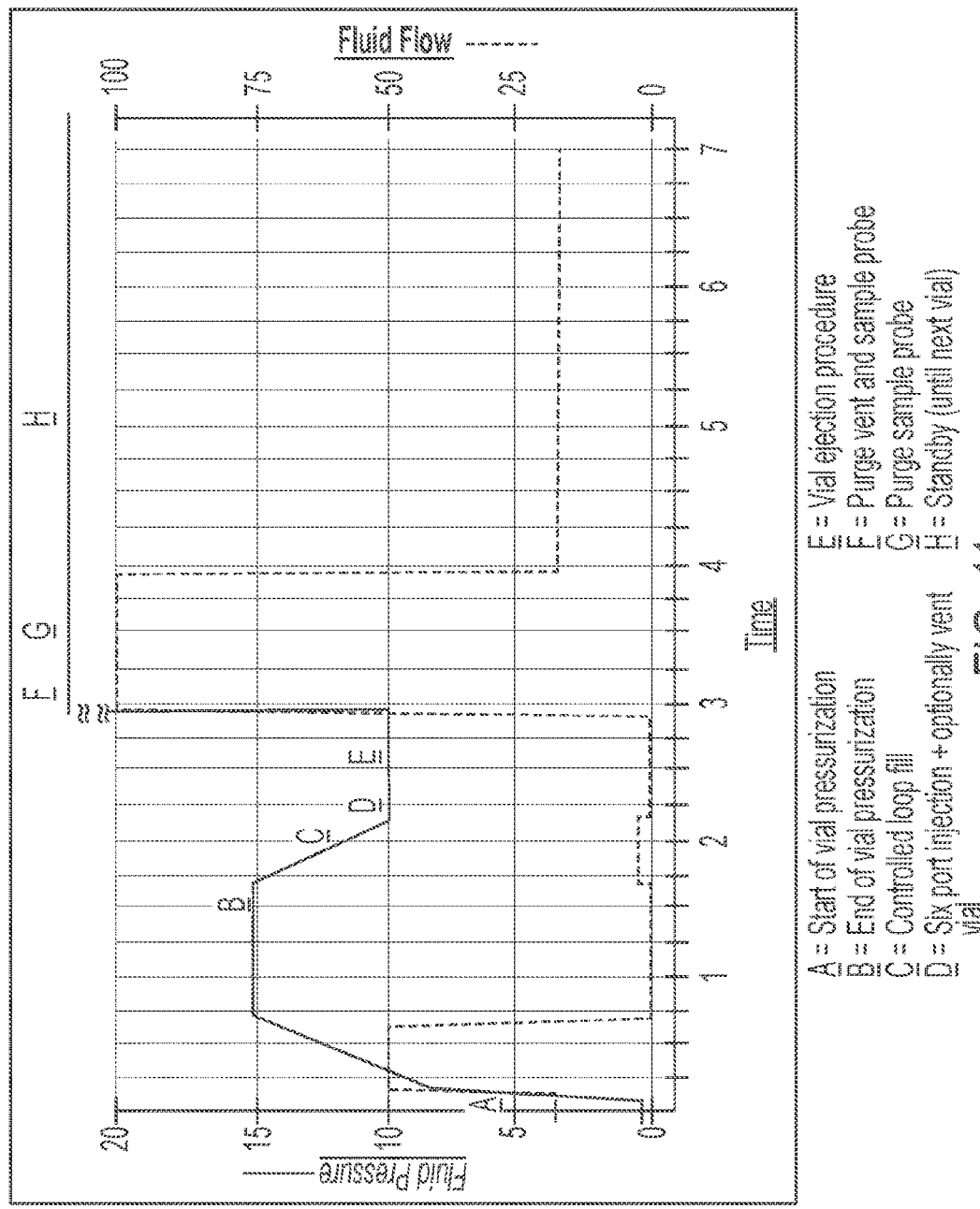

If the sample vial is unsuccessfully ejected from the sample probe, a sensor can sense static values in the sensed parameter during the vial ejection procedure. Or, for the example of a constant flowrate into the vial during ejection, a sensor can sense an increase in pressure up to a maximum allowed by the system (e.g., 75 psi may be the maximum applied during vial pressurization but the maximum allowed by the system may be 100 psi). In another case, if the sample probe becomes trapped in a septum of the sample vial or if the sample probe is clogged, a sensor can sense substantially static values in the sensed parameter during the vial ejection procedure. FIGS. 9-11 illustrate graphs of flow rate and pressure measurements of a gas chromatography system implementing examples of methods described above. The flow rate and pressure measurements are for flow paths fluidically coupled to the sample probe of the gas chromatography system. FIG. 9 depicts a scenario where the sample vial is successfully ejected, FIG. 10 depicts a scenario where the sample vial is unsuccessfully ejected, and FIG. 11 depicts a scenario where the sample probe is clogged (e.g., by a piece of septum or sample becoming lodged in the sample probe) or the opening of the sample probe is stuck in the septum of the sample vial.

Successful Ejection Example

FIG. 9 is a timing diagram depicting pressure and flow rate measurements during a successful sample vial ejection, according to an embodiment of the claimed invention. As discussed above, the gas chromatography system can connect the sample vial to the sample probe flow path and vial pressurization gas and pressurize the contents of the sample vial in events A and B. The headspace sampler can then fill the sample loop with sample, such as by fluidically coupling the sample probe and sample loop to a vent, which is depicted by event C. At event D, the gas chromatography system can transport the contents of the sample loop to the transfer line and gas chromatograph by fluidically connecting the sample loop to a carrier gas source.

At event E, the gas chromatography system can perform an ejection procedure of the sample vial. The system can configure the headspace sampler to close proportional valve 250 and proportional valve 260 of FIG. 2. Thus, the headspace sampler experiences no gas input across sensors fluidically coupled to the sample probe, but a pressure above atmospheric pressure exists within the sample vial at the beginning of the ejection procedure. As the sample vial leaves the sample probe during event E, a drop in pressure can be measured by the gas chromatography system, for example, using pressure sensor 245 of FIG. 2. Based on the drop in pressure, the gas chromatography system can determine that the sample vial is successfully removed, and continue operating in a normal procedure. At event F, the system can purge the sample probe and the vent. The system can then purge only the sample probe at event G, and initiate a standby mode to await another sample vial at event H.

Vial Stuck on Probe Example

FIG. 10 depicts pressure and flow rate measurements during a failed sample vial ejection, according to an embodiment of the claimed invention. The measurements depicted in FIG. 10 relate to a situation where the sample vial remains on the sample probe subsequent to an ejection procedure performed by the headspace sampler.

Events A, B, C, and D are as described above for FIG. 9.

At event E, the gas chromatography system can perform an ejection procedure of the sample vial. The system can configure the headspace sampler to close proportional valve 250 and proportional valve 260 of FIG. 2. During the ejection procedure, the headspace sampler experiences no gas input across sensors fluidically coupled to the sample probe, but a pressure above atmospheric pressure exists within the sample vial. As the sample vial remains on the sample probe during the ejection procedure, the gas chromatography system experiences substantially static pressure in the flow path fluidically connected to the sample probe during the ejection procedure. Thus, the gas chromatography system can identify the static pressure values in the probe-coupled flow path, for example, using pressure sensor 245 of FIG. 2. Based on the static pressure measurements (e.g., pressure values staying within a predefined threshold, a pressure rate of change staying within a predefined threshold, etc.), the gas chromatography system can determine that the sample vial remains on the sample probe, and the vial ejection has failed. If the system continues with normal purge operation of events F, G, and H, the pressure readings will increase due to the sample probe being fluidically connected to the sample vial (e.g., gas flowing into a closed volume).

Clogged Probe or Probe Stuck in Septum Example

FIG. 11 depicts pressure and flow rate measurements during a clogged probe or a probe opening stuck in the vial septum scenario, according to an embodiment of the claimed invention. The measurements depicted in FIG. 11 relate to a situation where the sample probe is either clogged or the opening of the sample probe is stuck in a vial septum during an ejection procedure performed by the gas chromatography system.

Events A, B, C, and D are as described above for FIG. 9 and FIG. 10.

At event E, the gas chromatography system can perform an ejection procedure of the sample vial. The system can configure the headspace sampler to close proportional valve 250 and proportional valve 260 of FIG. 2. During the ejection procedure, the headspace sampler experiences no gas input across sensors fluidically coupled to the sample probe, but a pressure above atmospheric pressure exists within the sample vial. As the sample probe is either clogged or the opening of the sample probe is stuck in the vial septum during the ejection procedure, the gas chromatography system experiences substantially static pressure during the ejection procedure. Thus, the gas chromatography system can measure static pressure values in the probe-coupled flow path, for example, using pressure sensor 245 of FIG. 2. Based on the static pressure measurements (e.g., pressure values staying within a predefined threshold, a pressure rate of change staying within a predefined threshold, etc.), the gas chromatography system can determine that the sample vial remains on the sample probe and the vial ejection has failed, or it could mean that the probe is clogged. If the system continues with normal operation of events F, G, and H, the pressure readings will increase within the system due to the sample probe not being open to atmosphere and, therefore, the limited volume within the system. In the case of a clogged sample probe or opening of the sample probe stuck in the septum, the pressure readings will increase even faster, due to an even more limited volume within the flow path coupled to the sample probe as compared to the opening of the sample probe stuck in the interior volume (headspace) of the sample vial (e.g., the volume of the flow path coupled to the sample probe will be the flow path between the pressure sensor 245 and the tip of the sample probe, and will not include the volume of the sample vial if the sample vial probe is clogged or the opening of the sample probe is stuck in the septum of the sample vial).

Further, in some cases, the risk of a clogged probe can be reduced by performing a restriction test prior to connecting a sample vial to the sample probe. For example, the gas chromatography system can flow gas through the sample probe and monitor a rate of change of the pressure for the sample probe. If the pressure rate of change exceeds a predefined threshold, the gas chromatography system can determine the sample probe is clogged (e.g., the rate of change in pressure will be quicker as compared to if the sample probe is unclogged and open to an ambient environment). In other cases, the gas chromatography system can monitor pressure values of the sample probe while flowing gas through the sample probe. If the pressure values exceed a predefined threshold at a specified flow rate, the gas chromatography system can determine the sample probe is clogged (e.g., the sample probe will reach higher pressure values as compared to if the sample probe is unclogged and open to an ambient environment). In yet other cases, the gas chromatography system can monitor standing backpressure generated from a standby flow. If the backpressure exceeds a predefined threshold, the gas chromatography system can determine the sample probe is clogged.

If the gas chromatography system determines that the sample probe is not clogged (e.g., via the restriction procedure), the system can then connect a sample vial to the sample probe. If the sample probe is not clogged immediately prior to connecting to a vial, there is a lower probability that the sample probe became clogged during sampling.

Active Pneumatic Test for Vial Presence

Alternatively, the gas chromatography system can configure the headspace sampler to input pressurization gas into the flow path connected to the sample probe after the vial is expected to have been ejected from the sample probe for the purpose of determining if the sample vial has successfully been ejected from the sample probe. This configuration, in some cases, allows for the venting of the sample vial to ambient pressure before attempting to remove the vial from the sample probe, which can provide the additional benefit of venting the vial prior to disposal or handling once ejected.

Before ejecting the vial, the system may vent the vial to atmospheric pressure or another pressure lower than the final sampling pressure, leave the vial with residual pressure from the sampling process, or otherwise increase or decrease the pressure in the vial or leave it unchanged relative to the end of the sampling process. The gas chromatography system can perform a vial ejection procedure and attempt to eject the sample vial from the sample probe. During the vial ejection procedure after the vial is expected to have been removed from the sample probe (based on time elapsed since start of ejection attempt, lifter position monitored by encoders or other sensors, etc.), the gas chromatography system can configure vial pressurization gas to flow into the connected flow path and through the sample probe. For example, switching valve 255 in the flow path shown in FIG. 2 may be open, with proportional valve 250 controlling the flow rate of gas through the sample probe or the pressure in the flow path connected to the sample probe. In some cases, the pressurization gas can be flowed through the flow path at a constant flowrate. The sensor or sensors coupled to the sample probe flow path (e.g., pressure sensor 245 and flow sensor 240 in FIG. 2) can measure various parameters of the flow path, such as flow rate and/or pressure.

The coupled sensor or sensors can sense a rate of change in pressure or flow rate for the connected flow path during the ejection procedure and while the gas is flowing into the connected flow path. The rate of change of the measured parameter can be dependent on whether the sample vial was successfully ejected from the sample probe. For example, the sensor or sensors can measure a slow increase (e.g., in pressure values) when the sample vial is successfully ejected from the sample probe. Alternatively, the sensor or sensors can measure a fast increase (e.g., in pressure values) when the sample vial is unsuccessfully ejected from the sample probe, if the sample probe is trapped in a septum of the sample vial, or if the sample probe is clogged. Situations where a clogged probe occurs can be limited by performing a restriction test prior to sampling the vial. These rate-of-change differences can be dependent on the volume in which the gas is flowing into.

For example, after the vial is expected to have been removed from the sample probe, the system can attempt to control the flow rate of gas through the sample probe to a setpoint (e.g., such as by using flow sensor 240 and proportional valve 250) and the pressure in the flow path coupled to the sample probe can be measured (e.g., such as with pressure sensor 245 in FIG. 2). If the sample vial is still on the sample probe or if the sample probe is clogged or trapped in a vial septum, the gas is flowing into a confined volume (e.g., the flow path, the sample probe, and, in some cases, the vial sample, etc.). Thus, the pressure sensed will increase quickly. Alternatively, if the sample vial is successfully removed, the gas will flow out of the sample probe and into the ambient environment (i.e., a much larger volume). Thus, the pressure sensed will increase more slowly (if measurable at all). The value of the pressure a given amount of time after the start of the measurement may also indicate whether the vial was successfully ejected. For example, if the vial was successfully ejected, the pressure, given a constant flowrate of gas through the sample probe, will increase to a value dependent on the restriction between the pressure sensor and the outlet of the sample probe, gas viscosity, and flow rate. Alternatively, if the sample vial was not successfully ejected, the pressure will increase to a much higher value as the gas is flowing into a closed system.

In some cases, the pressure in the flow path fluidically connected to the sample probe can be controlled in an attempt to reach a pressure setpoint after the sample vial is expected to have been removed from the sample probe, and the flow rate of gas required to achieve this setpoint can be measured (e.g., by monitoring flow sensor 240 in FIG. 2). In these cases, the gas chromatography system can increase the flow rate of the flowing gas until a pressure setpoint is reached (e.g., by monitoring pressure values from a pressure sensor coupled to the flow path of the sample probe, such as pressure sensor 245 in FIG. 2). If and when the pressure setpoint is reached, the gas chromatography system can identify the flow rate required for the pressure setpoint to be met. Depending on the pressure setpoint, the restriction of the connected flow path, and the viscosity of the gas, the headspace sampler may be unable to achieve the pressure setpoint. In some cases, this may also be an indication that the vial is successfully ejected. If the sample vial is unsuccessfully ejected, and the sample probe is still fluidically connected to the sample vial, a lower flow rate will be required to achieve the pressure setpoint compared to if the sample vial was successfully ejected from the sample probe. In some examples, the flow rate may be substantially zero if the ejection is not successful.

Additionally or alternatively, the system can identify the time taken for the pressure setpoint to be met. If the ejection procedure is successful, it may take longer to achieve a pressure setpoint than if the ejection procedure failed using the same flow rate. Based on these monitored values, the system can identify whether the vial was successfully ejected from the sample probe.

Figure 12:
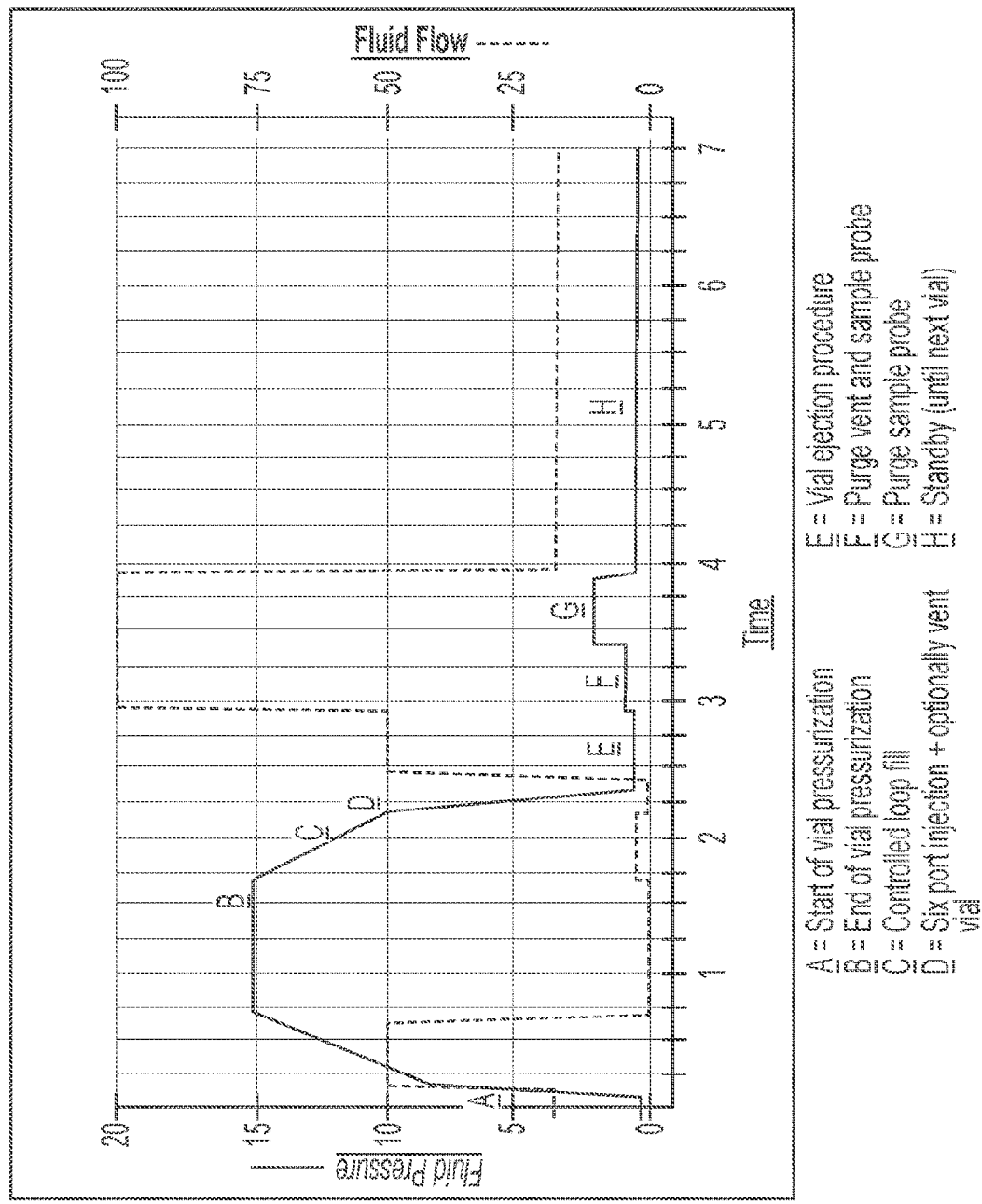
Figure 13:
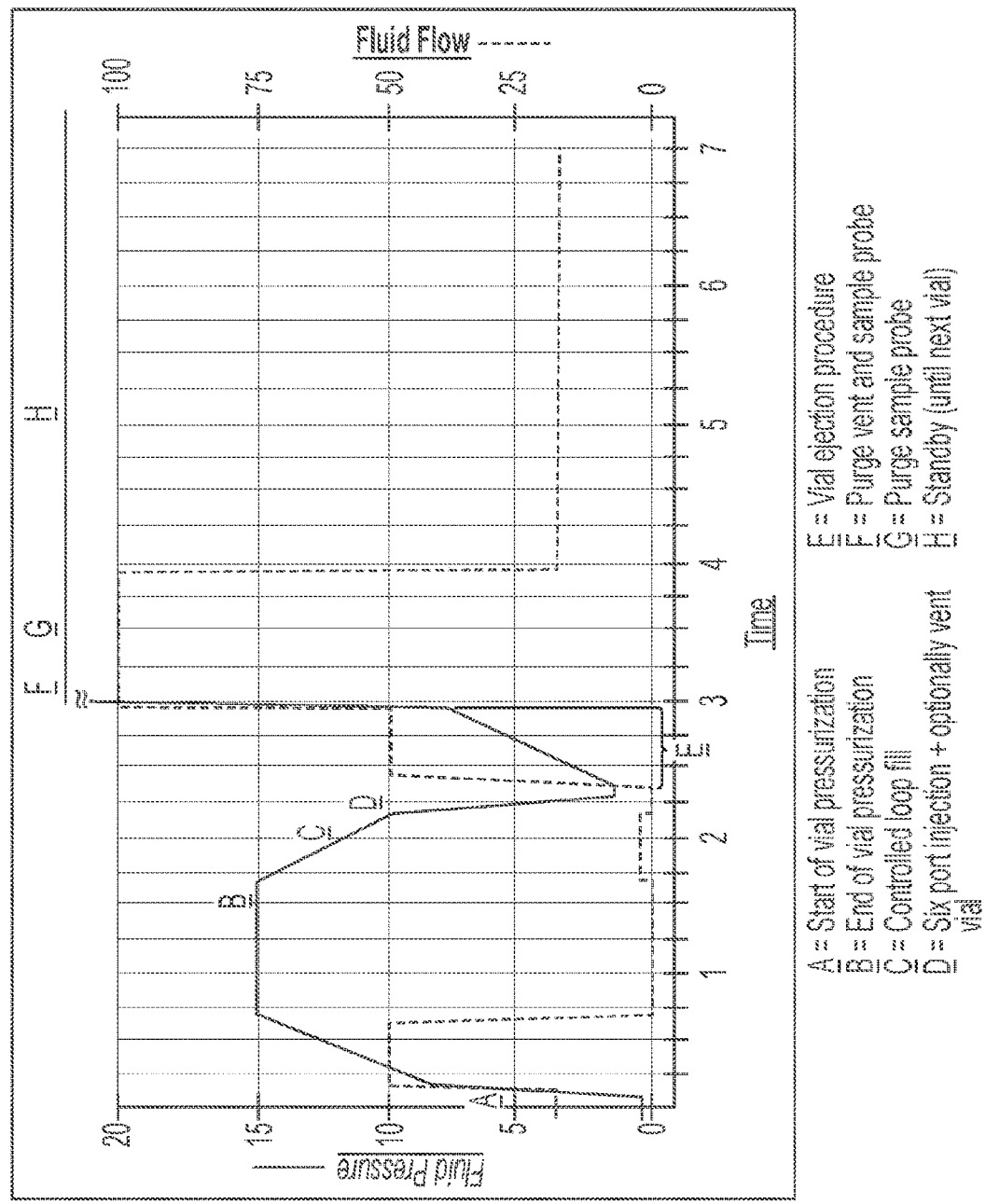
Figure 14:
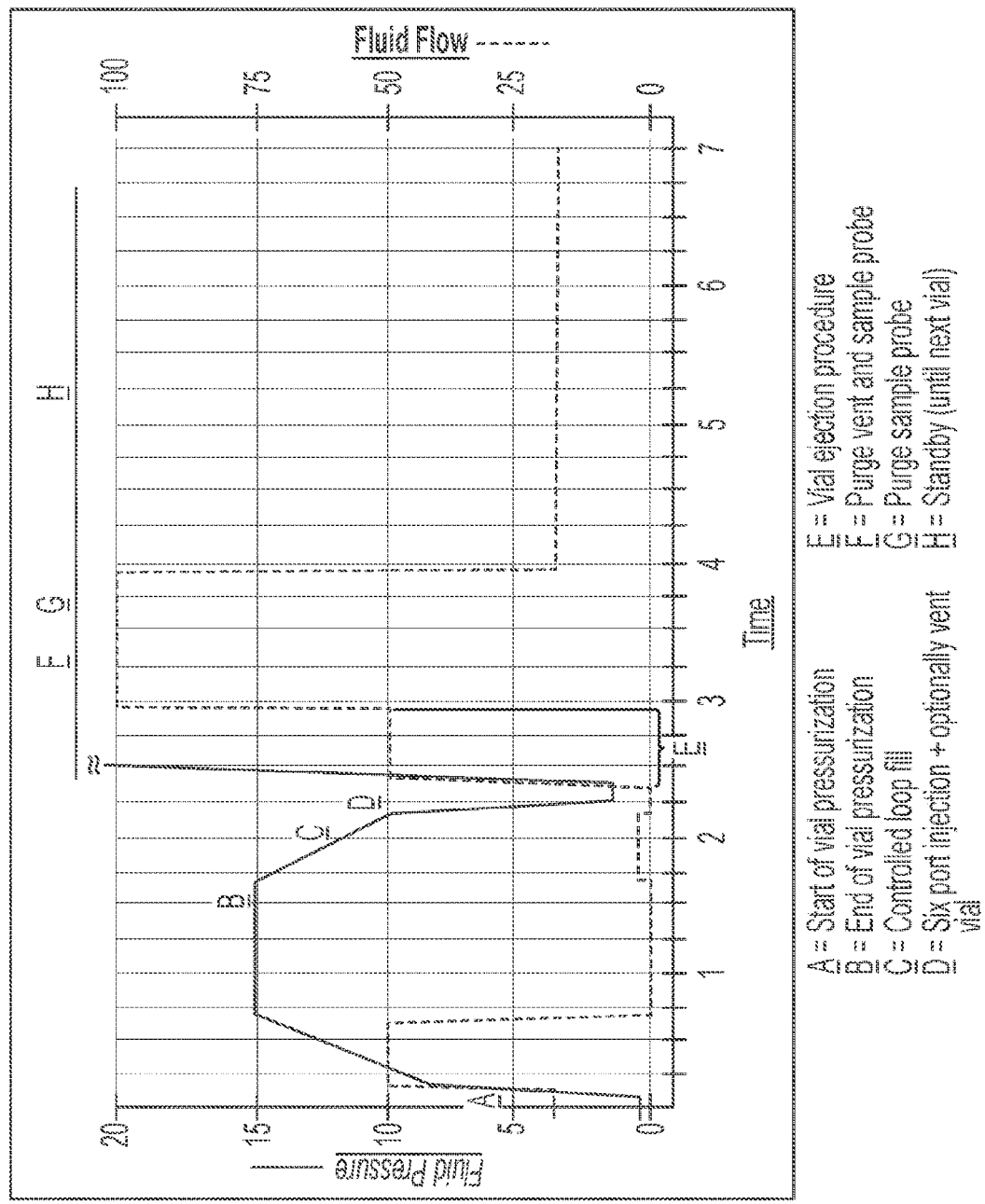

FIGS. 12-14 illustrate graphs of flow rate and pressure measurements of a gas chromatography system implementing examples of measurements described above. The flow rate and pressure measurements are for flow paths fluidically coupled to the sample probe of the gas chromatography system. FIG. 12 depicts a scenario where the sample vial is successfully ejected, FIG. 13 depicts a scenario where the sample vial is unsuccessfully ejected, and FIG. 14 depicts a scenario where the sample probe is clogged.

Successful Vial Ejection Example

FIG. 12 depicts pressure and flow rate measurements during a successful sample vial ejection, according to an embodiment of the claimed invention. As discussed above, the gas chromatography system can connect the sample vial to the sample probe flow path and vial pressurization gas and pressurize the contents of the sample vial in events A and B. The headspace sampler can then fill the sample loop with sample, such as by fluidically coupling the sample probe to a vent, which is depicted by event C. At event D, the gas chromatography system can transport the contents of the sample loop to the transfer line and GC column by fluidically connecting the sample loop to a carrier gas source. Optionally, at event D, the system can also vent the vial to a pressure setpoint or pressurize the vial to a setpoint.

At event E, the gas chromatography system can perform an ejection procedure of the sample vial. The system can attempt to remove the sample vial from the sample probe. During the ejection procedure after the vial is expected to be removed from the sample probe, the gas chromatography system can flow gas through the flow path connected to the sample probe. Since the vial was successfully ejected from the sample probe, the pressure will increase to a value based on the restriction of the flow path between the pressure sensor and the sample probe outlet, the gas viscosity, and the flow rate. The pressure value can be lower than a pressure value if the sample probe was still in the sample vial. At event F, the system can purge the sample probe and the vent. The system can then purge the sample probe at event G, and initiate a standby mode to await another sample vial at event H.

Vial Stuck on Probe Example

FIG. 13 depicts pressure and flow rate measurements during a failed sample vial ejection, according to an embodiment of the claimed invention. The measurements depicted in FIG. 13 relate to a situation where the sample vial remains on the sample probe during and after an ejection procedure performed by the gas chromatography system with the opening of the sample probe fluidically connected to the interior volume (headspace) of the sample vial.

Events A, B, C, and D are as described above for FIG. 12.

At event E, the gas chromatography system can perform an ejection procedure of the sample vial. During the ejection procedure after the vial is expected to be removed from the sample probe, the gas chromatography system can flow gas through the probe-coupled flow path. As the sample vial remains on the sample probe, the flow path is coupled to a predefined volume (e.g., volume of the sample vial). As the gas flows through the flow path, pressure within the flow path will increase at a rate greater than if the sample probe is open to an ambient environment. Thus, the gas chromatography system can identify the increasing pressure values in the probe-coupled flow path. Based on the rate of pressure increase or pressure achieved for the flowrate, the gas chromatography system can determine that the sample vial remains on the sample probe, and the ejection procedure has failed. If the system continues with normal operation of events F, G, and H, the pressure readings will increase due to the predefined volume in which gas is flowed within the system.

Clogged Probe or Probe Stuck in Septum Example

FIG. 14 depicts pressure and flow rate measurements during a clogged probe scenario, according to an embodiment of the claimed invention. The measurements depicted in FIG. 14 relate to a situation where the sample probe is either clogged or the opening of the sample probe is stuck in a vial septum during an ejection procedure performed by the gas chromatography system.

Events A, B, C, and D are as described above for FIG. 12 and FIG. 13.

At event E, the gas chromatography system can perform an ejection procedure of the sample vial. The system can attempt to remove the vial from the sample probe. During the ejection procedure after the vial is expected to be removed from the sample probe, the gas chromatography system can flow pressurization gas into the probe-coupled flow path. As the sample probe is either clogged or the opening of the sample probe is stuck in a vial septum, the flow path is fluidically connected to a predefined volume (even less volume than if the sample probe is stuck with the sample probe opening in the interior volume of the sample vial). As the gas flows through the flow path, pressure within the flow path will increase at a rate greater than if the sample probe is open to an ambient environment or stuck with the opening of the sample probe in the interior volume of the sample vial. Thus, the gas chromatography system can identify the increasing pressure values in the probe-coupled flow path. Based on the rate of pressure increase or pressure achieved for the specified flowrate, the gas chromatography system can determine that the sample probe is clogged or stuck in a vial septum, and the ejection procedure has failed. If the system continues with normal operation of events F, G, and H, the pressure readings will increase within the system due to the limited volume within the system.

It should be noted that as the flow path includes less volume than the situation where the opening of the probe remains in the sample vial, the pressure will increase more quickly in the case of a clogged septum-trapped probe. Similarly, when controlling to a pressure setpoint, the required flow rate and/or the time it takes for the system to meet a predefined pressure setpoint will be lower as well in the case of a clogged or septum-trapped probe compared to the opening of the sample probe remaining in the volume of a sample vial.

Parameter Thresholds

Parameter thresholds can be determined by the gas chromatography system prior to implementing the ejection process. In some cases, the parameter thresholds (e.g., step change thresholds, rate of change thresholds, etc.) can be determined by different characteristics of the sample, sample vial and/or the headspace sampler. For example, vial volume, solvent composition, headspace composition, pressurization gas composition, flow path restrictions, and the like, can be used to determine the thresholds used by the system to identify whether a sample vial was successfully ejected from the sample probe. In some cases, some of these characteristics can be inputted by a user of the gas chromatography system. Additionally or alternatively, some of these characteristics can be determined (e.g., sensed) by the gas chromatography system.

In some cases, parameter thresholds are not required to be calculated from measured parameter values. For example, in the case where no gas is flowing through the probe-coupled flow path and the sample vial is previously pressurized, if the vial is successfully ejected, the pressure will drop to ambient pressure independent of the vial parameters.

In other cases, the thresholds can be calculated based on measured parameters or a test vial can be placed on the probe prior to a sampling procedure. The test vial can then be ejected while measuring the flow and/or pressure. These flow and/or pressure values can then be used to determine the thresholds. The test vial can be confirmed to have been ejected by a user manually or by another part of the system (e.g., sensing that the vial eventually returned to its storage location).

System Remediation

Once the gas chromatography system detects the sample vial is unsuccessfully ejected from the sample probe, the system can implement a variety of remediation processes.

For example, the system can terminate chromatography functions, such as preparing another sample vial for sampling. In some cases, the system can generate and transmit (e.g., via the control system of FIG. 1) a notification, where the notification includes information corresponding to the unsuccessful ejection attempt. In some cases, the lifter rod of FIGS. 6 and 7 can be configured to actuate towards the sample probe, which can reenergize the compression spring 625 and potentially release the sample vial during a second ejection attempt and/or prevent the sample vial from falling off the sample probe. In some cases, the rack of FIGS. 6 and 7 can be actuated to rotate or oscillate, which may lightly tap the sample vial 610 and potentially release the sample vial 610. Similar mechanisms for tapping or reengaging the sample vial can be performed by the ejection mechanism, and one skilled in the art would understand the examples provided above are not self-limiting.

Sample Vial Pressure Restoration

A gas chromatography system can be configured to restore a pressure of a sample vial after sample extraction. When the sample is loaded into a sample vial and the sample vial is sealed, the vial is typically at or near ambient temperature and pressure. After being placed in the headspace sampler in preparation to be sampled, the sample vial can be heated to an elevated temperature. This can cause the pressure in the sample vial, which is a closed system, to rise. Prior to extracting the sample from the sample vial, the headspace sampler can connect the sample probe to a flow path with at least one coupled sensor. For example, the system can connect the sample vial to the sample probe 225 of the flow path in FIG. 2, while also closing proportional valve 250 and proportional valve 260 so that no gas can enter or exit the sample vial, but opening switching valve 255 so pressure sensor 245 is fluidically connected to sample probe 225. In some cases, when the sample vial is placed on the sample probe prior to pressurizing the sample vial with vial pressurization gas and/or extracting the sample, a coupled sensor can measure the pressure of the flow path, and therefore, the pressure in the sample vial.

Further, after extraction, the gas chromatography system can measure the pressure of the sample vial. For example, the same configuration as used to measure a parameter of the vial can be used for measuring a parameter post-extraction. Alternatively, another configuration can be used for post-extraction measurements. The system can identify (e.g., via the control system of FIG. 1) a difference in pressure of the sample vial post-extraction versus pre-extraction. Further, the system can flow vial pressurization gas or carrier gas for input into the sample vial for restoring the pressure of the sample vial to pre-extraction levels. Alternatively, if the post-extraction pressure is higher than the pre-extraction pressure, the system can vent gas from the sample vial for restoring the pressure of the sample vial to pre-extraction levels. This can be accomplished by monitoring pressure values of a pressure sensor and identifying when the pressure values reach a pressure setpoint.

Thus, the pressure within the sample vial can return to near-ambient levels when the sample vial is removed from the heated location and returns to near the pre-analysis temperature (e.g., room temperature). As the pressure within the sample vial is near the pressure of the environment, a force caused by pressure differential is minimized. This can decrease the risk of the vial septum yielding, or of the sample vial breaking due to structural weakening of the vial. Further, this process can be content-agnostic, as the process can be dependent on the pressure of the sample vial pre- and post-extraction. This can eliminate user error, particularly in the situation where a user inputs incorrect parameters related to the sample (e.g., gas composition, solvent composition, and the like).

EQUIVALENTS

Although preferred embodiments of the invention have been described using specific terms, such description is for illustrative purposes only, and it is to be understood that changes and variations may be made without departing from the spirit or scope of the following claims.

INCORPORATION BY REFERENCE

The entire contents of all patents, published patent applications, and other references cited herein are hereby expressly incorporated herein in their entireties by reference.

The invention claimed is:

1. A gas chromatography system comprising:
 a sample vial;
 a sample probe;
 a fluid source in fluid communication with the sample probe;
 a pressure sensor in fluid communication with the sample probe; and
 a processor configured to:
  (a) execute an ejection procedure to remove the sample vial from the sample probe;
  (b) receive a set of signals from the pressure sensor;
  (c) detect whether the ejection procedure is successful from the set of signals; and
  (d) in response to the detection of whether the ejection procedure is successful from the set of signals, initiate one or more actions selected from the group consisting of: a remediation and an alert.

2. The gas chromatography system of claim 1, wherein the processor in step (c) is further configured to:
 determine a change in values within the set of signals; and
 determine that the sample vial is removed from the sample probe from the change in values.

3. The gas chromatography system of claim 1, wherein the processor is further configured to:
 remediate by terminating chromatography functions if the processor detects a failed ejection procedure.

4. The gas chromatography system of claim 1, wherein the processor is further configured to:
 determine a pressure reading of the set of signals measures, during step (a), either below or within a predefined threshold or to atmospheric pressure when the ejection procedure is successful, and the predefined threshold from a vial volume, a solvent composition, a headspace composition, a pressurization gas composition, flow path restrictions, flow rate or pressure measurements of a test vial, or a combination thereof.

5. The gas chromatography system of claim 1, wherein the processor in step (c) is further configured to:
 determine a change in a value does not occur within the set of signals; and
 determine that the sample vial has either failed to be removed from the sample probe, or the sample probe is stuck in a septum of the sample vial, or the sample probe is clogged, from the set of signals.

6. The gas chromatography system of claim 1, further comprising:
 a vial actuator to actuate the sample vial; and
 a vial rack to release the sample vial, wherein the processor in step (d) is further configured to:
control the vial actuator to actuate the sample vial towards the sample probe in response to determining the ejection procedure failed; or
control, to actuate the vial rack, to release the sample vial, wherein the actuation of the vial rack occurs in response to determining the ejection procedure failed.

7. The gas chromatography system of claim 1, further comprising:
a heater in thermal communication with the sample vial, wherein the heater is configured to generate a heated condition of the sample vial, wherein the processor is further configured to:
receive a first set of signals from the pressure sensor;
determine an initial pressure of the sample vial in the heated condition from the first set of signals;
execute an extraction procedure of contents of the sample vial;
receive a second set of signals from the pressure sensor after the extraction procedure;
determine a second pressure of the sample vial; and
control the fluid source or a vent in fluidic communication with the sample vial to revert the second pressure of the sample vial to the initial pressure.

8. A gas chromatography system comprising:
a sample vial;
a sample probe;
a fluid source in fluid communication with the sample probe;
a pressure sensor in fluid communication with the sample probe; and
a processor configured to:
(a) execute an ejection procedure to remove the sample vial from the sample probe;
(b) flow fluid via the fluid source to the sample probe during step (a);
(c) receive a set of signals from the pressure sensor during step (b);
(d) detect whether the ejection procedure is successful from the set of signals; and
(e) in response to the detection of whether the ejection procedure is successful from the set of signals, initiate one or more actions selected from the group consisting of: a remediation and an alert.

9. The gas chromatography system of claim 8, further comprising a flow sensor in fluid communication with the sample probe, wherein a subset of the set of signals are received from the flow sensor.

10. The gas chromatography system of claim 8, wherein the processor in step (d) is further configured to:
determine a change in values within the set of signals; and
determine that the sample vial is removed from the sample probe from the change in values.

11. The gas chromatography system of claim 8, wherein the processor in step (d) is further configured to:
determine a rate of change within the set of signals;
determine the rate of change is below a predefined threshold; and
determine the ejection procedure was successful.

12. The gas chromatography system of claim 8, wherein the processor in step (d) is further configured to:
determine a rate of change within the set of signals;
determine the rate of change exceeds or is within a predefined threshold; and
determine that the sample vial has failed to be removed from the sample probe from the set of signals.

13. The gas chromatography system of claim 8, wherein the processor in step (d) is further configured to:
determine a rate of change within the set of signals;
determine the rate of change exceeds a predefined threshold; and
determine, from the set of signals, the sample probe is either trapped in a septum of the sample vial or the sample probe is clogged.

14. The gas chromatography system of claim 8, wherein the processor in step (e) is further configured to:
control a vial actuator to actuate the sample vial towards the sample probe in response to determining the ejection procedure failed; or
control a vial rack to actuate, wherein the actuation occurs in response to determining the ejection procedure failed.

15. The gas chromatography system of claim 8, further comprising:
a heater in thermal communication with the sample vial, wherein the heater is configured to generate a heated condition of the sample vial, wherein the processor is further configured to:
receive a first set of signals from the pressure sensor;
determine an initial pressure of the sample vial in the heated condition from the first set of signals;
execute an extraction procedure of contents of the sample vial;
receive a second set of signals from the pressure sensor after the extraction procedure;
determine a second pressure of the sample vial; and
control the fluid source or a vent in fluidic communication with the sample vial to revert the second pressure of the sample vial to the initial pressure.

16. A gas chromatography system comprising:
a sample vial;
a sample probe;
a fluid source in fluid communication with the sample probe;
a flow sensor in fluid communication with the sample probe; and
a processor configured to:
(a) execute an ejection procedure to remove the sample vial from the sample probe;
(b) receive a set of signals from the flow sensor;
(c) detect whether the ejection procedure is successful from the set of signals; and
(d) in response to the detection of whether the ejection procedure is successful from the set of signals, initiate one or more actions selected from the group consisting of: a remediation and an alert.

17. The gas chromatography system of claim 16, wherein the processor in step (c) is further configured to:
determine a change in values within the set of signals; and
determine that the sample vial is removed from the sample probe from the change in values.

18. The gas chromatography system of claim 16, wherein the processor is further configured to:
maintain a constant pressure level in the sample probe during steps (a) and (b).

19. The gas chromatography system of claim 16, wherein the processor is further configured to:
remediate by terminating chromatography functions if the processor detects a failed ejection procedure.

20. The gas chromatography system of claim 16, wherein the processor in step (c) is further configured to:
determine a change in a value does not occur within the set of signals; and determine that the sample vial has either failed to be removed from the sample probe, or the sample probe is stuck in a septum of the sample vial, or the sample probe is clogged, from the set of signals.

21. The gas chromatography system of claim 16, wherein the processor in step (e) is further configured to:
control a vial actuator to actuate the sample vial towards the sample probe in response to determining the ejection procedure failed; or
control a vial rack to actuate, wherein the actuation occurs in response to determining the ejection procedure failed.

22. A gas chromatography system comprising:
a sample vial;
a sample probe;
a fluid source in fluid communication with the sample probe;
a flow sensor in fluid communication with the sample probe; and
a processor configured to:
(a) execute an ejection procedure to remove the sample vial from the sample probe;
(b) flow fluid via the fluid source to the sample probe;
(c) receive a set of signals from the flow sensor during step (b);
(d) detect whether the ejection procedure is successful from the set of signals; and
(e) in response to the detection of whether the ejection procedure is successful from the set of signals, initiate one or more actions selected from the group consisting of: a remediation and an alert.

23. The gas chromatography system of claim 22, further comprising a pressure sensor in fluid communication with the sample probe, wherein a subset of the set of signals are received from the pressure sensor.

24. The gas chromatography system of claim 22, wherein the processor in step (e) is further configured to:
control a vial actuator to actuate the sample vial towards the sample probe in response to determining the ejection procedure failed; or
control a vial rack to actuate, wherein the actuation occurs in response to determining the ejection procedure failed.

* * * * *